(12) United States Patent
Xiong et al.

(10) Patent No.: US 12,327,132 B2
(45) Date of Patent: Jun. 10, 2025

(54) REQUEST PROCESSING METHODS AND APPARATUSES, COMPUTING DEVICE AND STORAGE MEDIUM

(71) Applicant: TENCENT TECHNOLOGY (SHENZHEN) COMPANY LIMITED, Shenzhen (CN)

(72) Inventors: Liangchun Xiong, Shenzhen (CN); Anqun Pan, Shenzhen (CN); Hailin Lei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/336,132

(22) Filed: Jun. 16, 2023

(65) Prior Publication Data

US 2023/0333878 A1    Oct. 19, 2023

Related U.S. Application Data

(63) Continuation of application No. PCT/CN2022/108772, filed on Jul. 29, 2022.

(30) Foreign Application Priority Data

Aug. 30, 2021    (CN) .......................... 202111003764.2

(51) Int. Cl.
*G06F 16/20*    (2019.01)
*G06F 9/46*    (2006.01)

(52) U.S. Cl.
CPC .................................... *G06F 9/468* (2013.01)

(58) Field of Classification Search
CPC ...................................................... G06F 9/468
See application file for complete search history.

(56) References Cited

U.S. PATENT DOCUMENTS 11,243,920 B2    2/2022  Xiao
2003/0084268 A1  5/2003  Mashima
(Continued)

FOREIGN PATENT DOCUMENTS

CN    108089926 A    5/2018
CN    109753364 A    5/2019
(Continued)

OTHER PUBLICATIONS

China National Intellectual Property Administration (CNIPA) Office Action 1 for 202111003764.2 Apr. 21, 2021 12 Pages (including translation).
(Continued)

*Primary Examiner* — Mohammad S Rostami
(74) *Attorney, Agent, or Firm* — ANOVA LAW GROUP, PLLC

(57) ABSTRACT

This application discloses request processing methods and apparatuses. The request processing method, performed by a first computing device in a clustered database includes determining a lock synchronization mode of the clustered database in response to a data request; locking a data resource corresponding to the data request when the lock synchronization mode is a weak synchronization mode, and executing the data request; obtaining locking feedback information about the data resource by at least one second computing device in the clustered database when the lock synchronization mode is not the weak synchronization mode, the locking feedback information indicating whether the second computing device has locked the data resource; and locking the data resource corresponding to the data request when the obtained locking feedback information satisfies a target condition corresponding to the lock synchronization mode, and executing the data request.

20 Claims, 10 Drawing Sheets

(56) References Cited

U.S. PATENT DOCUMENTS

| | | | |
|---|---|---|---|
| 2008/0208938 A1 | 8/2008 | Lin et al. | |
| 2010/0191884 A1* | 7/2010 | Holenstein | G06F 16/2343 |
| | | | 707/613 |
| 2011/0270799 A1* | 11/2011 | Muratov | G06F 16/27 |
| | | | 707/610 |
| 2013/0185270 A1 | 7/2013 | Brower et al. | |
| 2014/0281196 A1* | 9/2014 | Dixon | G06F 9/30087 |
| | | | 711/152 |
| 2016/0098303 A1* | 4/2016 | Balakrishnan | G06F 9/52 |
| | | | 718/102 |
| 2018/0081956 A1* | 3/2018 | Xu | G06F 16/275 |
| 2018/0314559 A1 | 11/2018 | Bharathy et al. | |
| 2019/0026151 A1 | 1/2019 | Ruiz et al. | |
| 2021/0097051 A1* | 4/2021 | Cohen | G06F 16/2343 |
| 2021/0263786 A1* | 8/2021 | Geiselhart | G06F 9/546 |
| 2021/0385772 A1* | 12/2021 | Zandsteeg | H04W 56/0015 |
| 2022/0114145 A1 | 4/2022 | Piao | |
| 2022/0138175 A1* | 5/2022 | Mahendra Kumar | |
| | | | G06F 16/2365 |
| | | | 707/694 |
| 2023/0100223 A1 | 3/2023 | Li | |
| 2023/0230097 A1* | 7/2023 | Burnett | G06F 11/0745 |
| | | | 707/703 |
| 2024/0118176 A1* | 4/2024 | Mayes | G05B 19/0421 |

FOREIGN PATENT DOCUMENTS

| | | | |
|---|---|---|---|
| CN | 111897646 A | 11/2020 | |
| CN | 112039970 A | 12/2020 | |
| CN | 112099961 A | 12/2020 | |
| CN | 112148695 A | 12/2020 | |
| CN | 112463311 A | 3/2021 | |
| CN | 112835722 A | 5/2021 | |
| CN | 112988913 A | 6/2021 | |
| CN | 113254226 A | 8/2021 | |
| JP | 2003140939 A | 5/2003 | |
| WO | 2015134679 A2 | 9/2015 | |
| WO | 2018077073 A1 | 5/2018 | |

OTHER PUBLICATIONS

The World Intellectual Property Organization (WIPO) International Search Report for PCT/CN2022/108772 Oct. 25, 2022 14 Pages (including translation).

Liu et al. "Microcomputer & Its Applications Dynamic granularity lock management mechanism for data warehouses", Nov. 25, 2004 (Nov. 25, 2004).

Shi "China Excellent Master's Thesis Full Text Database Information Technology Series Research on Collaborative Design Platform Based on Web Services", Dec. 15, 2011 (Dec. 15, 2011).

Abbas "2016 International Conference on Computer Communication and Informatics (ICCCI) Concurrency control in distributed database system", May 30, 2016 (May 30, 2016).

The European Patent Office (EPO) The Extended European Search Report for Application No. 22862978.8 Nov. 4, 2024 19 Pages.

The Japan Patent Office (JPO) Notice of Reasons for Refusal for Application No. 2023-571701 Dec. 9, 2024 7 Pages (including translation).

* cited by examiner

REQUEST PROCESSING METHODS AND APPARATUSES, COMPUTING DEVICE AND STORAGE MEDIUM

RELATED APPLICATIONS

This application is a continuation of PCT Application No. PCT/CN2022/108772, filed on Jul. 29, 2022, which claims priority to Chinese Patent Application No. 2021110037642, filed with the China National Intellectual Property Administration on Aug. 30, 2021, and entitled "REQUEST PROCESSING METHODS AND APPARATUSES, COMPUTING DEVICE AND STORAGE MEDIUM." The two applications are both incorporated herein by reference in their entirety.

FIELD OF THE TECHNOLOGY

This application relates to the technical field of databases, and in particular to request processing technology.

BACKGROUND OF THE DISCLOSURE

With the development of database technology, clustered databases have become more popular. At present, both a stand-alone database such as MySQL and PostgreSQL and a clustered database such as IBM and Oracle adopt a concurrency control method based on a strong synchronization locking mechanism. The strong synchronization locking mechanism refers to when an application for locks will not succeed until locks of corresponding levels are obtained in all computing devices in a cluster; otherwise, the application process needs to wait. This process will fail in applying for locks as long as any one of the computing devices in the cluster fails in applying for locks.

In the clustered database, the strong synchronization locking mechanism requires all the computing devices in the cluster to obtain the locks of the corresponding levels. As the number of computing devices in the cluster increases, the cost of applying for locks increases significantly, which leads to a low processing capability of a clustered database system. Therefore, there is an urgent need for a method that can improve the processing capability of the clustered database system.

SUMMARY

Embodiments of this application provide request processing methods and apparatuses, a computing device and a storage medium, which can improve the processing capability of the clustered database. The technical solutions are as follows:

One aspect of this disclosure provides a request processing method, which is performed by a first computing device in a clustered database. The request processing method includes determining a lock synchronization mode of the clustered database in response to a data request; locking a data resource corresponding to the data request when the lock synchronization mode is a weak synchronization mode, and executing the data request; obtaining locking feedback information about the data resource by at least one second computing device in the clustered database when the lock synchronization mode is not the weak synchronization mode, the locking feedback information indicating whether the second computing device has locked the data resource; and locking the data resource corresponding to the data request when the obtained locking feedback information satisfies a target condition corresponding to the lock synchronization mode, and executing the data request.

In one aspect, a computing device is provided. The computing device includes one or more processors and one or more memories, the one or more memories storing at least one computer program which is loaded and executed by the one or more processors to implement the request processing method of any one of the above possible implementations.

In one aspect, a non-transitory storage medium is provided, which stores at least one computer program, the computer program being loaded and executed by a processor to implement the request processing method of any one of the above possible implementations.

In embodiments consistent with the present disclosure, by setting a plurality of flexible levels for lock synchronization modes, in a weak synchronization mode, a data resource corresponding to a data request is directly locked, and the data request is executed, which can ensure that the data request is advanced preferentially, without waiting for a response of a second computing device. In a non-weak synchronization mode, locking feedback information of various second computing devices is obtained. When the obtained locking feedback information satisfies a target condition, the data resource is locked, and the data request is executed. Different lock synchronization modes can be selected in different service scenarios, thereby ensuring that a clustered database can meet processing requirements of different service scenarios, which improves the processing capability of a clustered database system.

DESCRIPTION OF EMBODIMENTS

Figure 1:
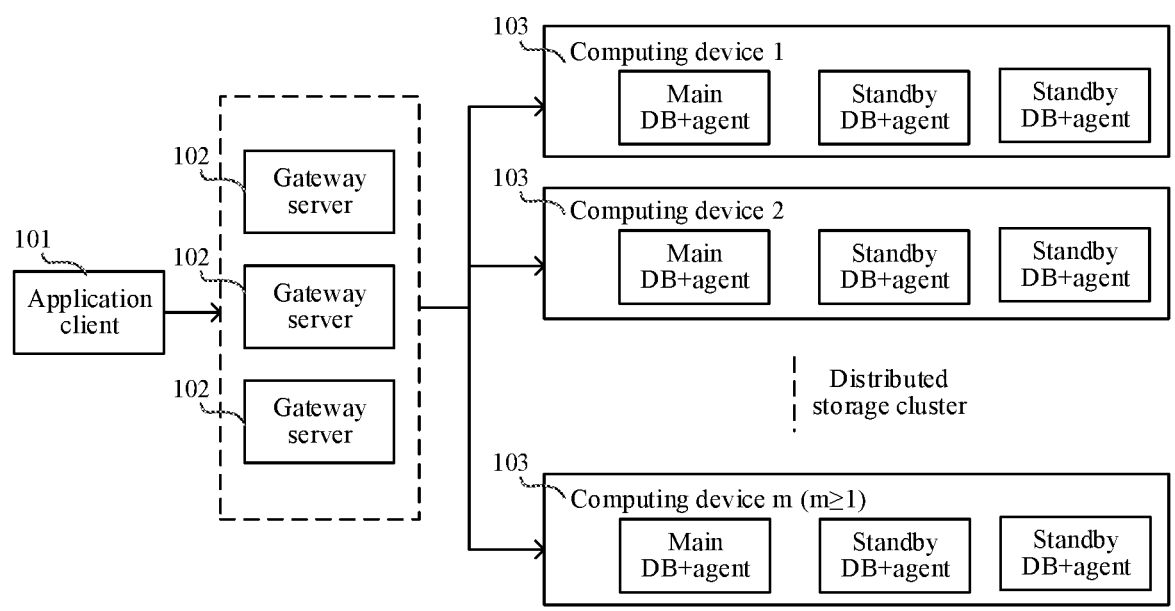
FIG. 1 is a schematic diagram of an implementation environment of a request processing method provided according to an embodiment of this application.

To make the objectives, technical solutions, and advantages of this application clearer, the following further describes implementations of this application in detail with reference to the accompanying drawings.

The terms "first," "second," and the like are used herein to distinguish the same or similar items that perform substantially the same function, and it is to be understood that the terms "first", "second", and "nth" do not have a logical or chronological dependency on each other or limit the number and order of execution.

The term "at least one" in this application means one or more, and the term "plurality" means two or more. For example, a plurality of first positions means two or more first positions.

Before the embodiments of this application are introduced, it is necessary to introduce some basic concepts in the field of cloud technologies.

Cloud Technology: It refers to hosting technology that unifies series resources such as hardware, software, and networks in a wide area network or a local area network to achieve computation, storage, processing, and sharing of data. The cloud technology is a general name of a network technology, an information technology, an integration technology, a management platform technology, an application technology, and the like applied on the basis of a cloud computing service mode, can form a resource pool for on-demand use, and is flexible and convenient. Cloud computing technology is an important support in the field of cloud technology. Background services of a technical network system require a large amount of computing and storage resources, such as video websites, image websites, and more portal websites. With the high development and application of the Internet industry, each article may have its own identification mark which needs to be transmitted to a background system for logic processing. Data of different levels will be processed separately, and various kinds of industry data need a strong system backing support, which can be achieved through cloud computing.

Cloud Storage: It is a new concept that expands and develops on cloud computing. A distributed cloud storage system (hereinafter referred to as storage system) refers to a storage system which integrates a large number of different types of storage devices (storage devices are also referred to as storage nodes) in a network through functions of a cluster application, a grid technology, and a distributed storage file system to work together through application software or application interfaces, to provide data storage and service access functions together.

Database: In short, a database can be regarded as an electronic file cabinet, namely, a place for storing electronic documents, and users can perform operations on data such as addition, query, update, and deletion. The so-called "database" is a data set that is stored together in a manner and can be shared with many users, has as little redundancy as possible, and is independent of application programs.

Terms involved in the embodiments of this application will be explained below.

Computing device: It is a computing node, which refers to a node device in a database (which is usually referred to as a clustered database. For a stand-alone database, a stand-alone device itself is a computing device), which is used for processing a user-specific computing request and is configured to execute a user request. The computing device may also be referred to as an SQL engine. SQL is for Structured Query Language.

Locking mechanism: During the running of a clustered database, on different computing devices or the same computing there will be a phenomenon that different processes or threads need to modify the same data resource at the same time (for example: a database, a data table, a data column, and data index). The locking mechanism can ensure the modification correctness of the data resource in different concurrent processes or threads. The clustered database can be divided into a central clustered database and a distributed clustered database. The central clustered database refers to a clustered database having a centralized control module, and the distributed clustered database refers to a decentralized clustered database.

Strong synchronization locking mechanism: That is, application for locks will not succeed until locks of corresponding levels are obtained in all computing devices in a cluster in process of applying for locks, and the application for a lock is successful; otherwise, the application process needs to wait. This process will fail in applying for locks as long as any one of the computing devices in the cluster fails in applying for locks.

The strong synchronization locking mechanism has an extremely high requirement for inter-node (namely, inter-computing device) communication performance. As a result, executions of other computing devices in a cluster are easily blocked by this computing device because of no response or fault of a single computing device, so that it is seen from the outside that the service processing capability of the whole cluster obviously decreases. For example, the service processing of the whole cluster is hung. In general, the strong synchronization locking mechanism is used in a scenario of a stand-alone database and a central clustered database.

Weak synchronization locking mechanism: During execution of some processes or threads (for example, a process or thread of a DDL request), if a certain type of data resource needs to be locked, advancing is directly performed without applying locks from other computing devices. The correctness of the operation can be guaranteed by a specific mechanism, namely, Writing Fence. Under the guarantee of the Writing Fence mechanism, the process or thread of the DDL request can be directly advanced and executed without applying for a lock, and a writing fence is advanced, so that when other service processes or threads operate data, it is necessary to compare whether the version of the writing fence for this operation is consistent with the version of a writing fence of latest data storage. If the two versions are inconsistent, service transactions corresponding to the service process or thread needs to be rolled back, to ensure the correctness and consistency of data processing.

The weak synchronization locking mechanism is in a sense to guarantee that a DDL request take precedence, because once the writing fence is advanced, a data manipulate language (DML) request of a corresponding operation may be rolled back, that is, the weak synchronization locking mechanism is very unfriendly to DML requests. The above weak synchronization locking mechanism can be regarded as a certain type of process or thread (such as a process of a DDL request) being executed preferentially. This kind of weak synchronization mode needs to use auxiliary means (such as a writing fence or a lease mechanism) to ensure the correctness of advancing of the whole mechanism. Although this kind of weak synchronization mode is suitable for a distributed clustered database scenario, there is a situation that a performance behavior of a user is inconsistent with an execution behavior of an example database, and the weak synchronization mode is not friendly to DML requests. At the same time, since it is considered that a DDL process or thread in the weak synchronization mode has obtained a lock by default, this can cause a large number of transactions executed by other types of DML processes or threads to be rolled back.

Semi-strong synchronization locking mechanism: It is a compromise between the above two locking mechanisms (the strong synchronization locking mechanism and the weak synchronization locking mechanism). Since each of the above two locking mechanisms has obvious advantages and disadvantages, the performances of the two mechanisms used in a distributed clustered database will be very challenging, so the concept of a semi-strong synchronization locking mechanism is very necessary for high-performance processing of user services in a large-scale distributed cluster. That is, when a process or thread needs to apply for a lock for a certain data resource, a method for transmitting a lock application to all computing devices is also used. Time counting starts at the same time. Within a period of waiting time, whether the lock application is successful is determined according to feedback (such as locking feedback information) of a specified target number of computing devices. This semi-strong synchronization mode will neither cause a significant decrease or invalidation to the processing capability of the whole cluster due to no response of some computing devices, nor cause unfair treatment that other DML (which are usually user service transactions and are important indicators for evaluating the quality and performance of data services supplied by databases) requests are rolled back because of an assumption that a process or thread inherently owns a lock.

Data Definition Language (DDL) request: It is a DDL statement operation used for modifying a data object (for example: a database, a data table, a data column, and a data index) in a database.

Data Manipulate Language (DML) request: It is a DML statement operation, referring to an operational statement used for modifying user data stored in a database and usually corresponding to a user service transaction. That is, a DML request is usually a service request, and is usually a user service transaction, which is an important indicator used for evaluating the quality and performance of data services supplied by a database.

Embodiments of this application are applied to a clustered database (namely, a clustered database system). The clustered database includes a central clustered database and a distributed clustered database. The central clustered database refers to a clustered database having a centralized control module, and a center node is configured in a cluster to deploy a global transaction manager and a global lock management module. The distributed clustered database refers to a decentralized clustered database, and there is no center node in a cluster to deploy a global transaction manager and a global lock management module. Implementation of a global transaction and a global lock is achieved by all computing nodes in the cluster by using a certain algorithm. For example, the distributed clustered database is, for example, a distributed database system, a distributed big data processing system, and a distributed database management system using a similar architecture.

A clustered database may include at least one computing device (namely, computing node), and a database of each computing device may store a plurality of data tables. Each data table may be used for storing one or more data rows (records). Each data row is composed of a group of field sets, namely, data field columns, arranged according to specific position indexes The database of the computing device may be any type of clustered database, and may include at least one of a relational database or a non-relational database, such as a Structured Query Language (SQL) database, MySQL, NoSQL, and NewSQL (generally referring to various new extensible/high-performance databases). The embodiments of this application will not make specific restrictions on the type of database.

In some embodiments, the embodiments of this application can also be applied to a blockchain technology-based database system (hereinafter referred to as a "blockchain system"), and the above blockchain system is a decentralized distributed database system in nature. A consensus algorithm is used to keep ledger data recorded in different computing devices on a blockchain consistent. A cryptographic algorithm is used to ensure encrypted transmission and non-tampering of ledger data between different computing devices. A script system is used to expand a ledger function. Interconnection between different computing devices is performed by using network routing.

A blockchain system may include one or more blockchains. A blockchain is a string of associated data blocks generated using a cryptographic method. Each data block includes information of a batch of network transactions to verify the validity (anti-counterfeiting performance) of the information and generate a next block.

A Peer to Peer (P2P) network can be formed between the computing devices in the blockchain system. A P2P protocol is an application layer protocol run on a Transmission Control Protocol (TCP). In the blockchain system, any computing device may have the following functions: 1) routing, which is a basic function of the computing device and is used for supporting communications between the computing devices; 2) application, to the blockchain, realizing a specific service according to a service requirement; recording data related to the specific service to form ledger data which carries a digital signature to represent a data resource; and transmitting the ledger data to other computing devices in the blockchain system, so that other computing devices add the ledger data to a temporary block when verification of the source and integrity of the ledger data succeeds, services realized by the application including a wallet, a shared ledger, an intelligent contract, and the like; and 3) a blockchain, including a series of blocks successively in a chronological order. A new block is no longer removed once it is added to the blockchain, and the blocks record ledger data submitted by the computing devices in the blockchain system.

In some embodiments, each block may include a hash value (a hash value of this block) of a transaction record stored in this block and a hash value of a previous block. Each block is connected via the hash value to form a blockchain. In addition, the block may further include information such as a time stamp when the block is generated.

A system architecture of an embodiment of this application will be described below.

FIG. 1 is a schematic diagram of an implementation environment of a request processing method provided according to an embodiment of this application. Referring to FIG. 1, a distributed clustered database is taken as an example. A distributed clustered database system includes an application client 101, a gateway server 102, and a distributed storage cluster 103. The distributed storage cluster 103 includes one or more computing devices.

The application client 101 refers to a client that is installed and run on a terminal of a user side and can initiate a data request. The data request can be a DDL request, a DML request, or the like. This embodiment does not make a specific restriction on this. In some embodiments, types of the application client 101 include, but are not limited to: a payment application, a social application, an audio and video application, a livestreaming application, a shopping application, a take-out application, a taxi application, or the like. This embodiment does not make a specific restriction on the type of application client 101. In some embodiments, the terminal of the user side is also referred to as a user equipment, a terminal device, a user terminal, a mobile terminal, a smart terminal, a communication device, and the like. In some embodiments, device types of the terminal include, but are not limited to a smart phone, a tablet computer, a notebook computer, a desktop computer, a smart loudspeaker box, a smart watch, a vehicle-mounted terminal, a smart home appliance, a smart voice interaction device, and the like.

The application client 101 and the gateway server 102 can be directly or indirectly connected in a wired or wireless communication manner. This application does not limit this.

The gateway server 102 is configured to receive an external data request, and distribute a read-write transaction corresponding to the data request to the distributed storage cluster 103. Schematically, a user logs in the application client 101 on a terminal, and triggers the application client 101 to generate a DDL request. For example, the DDL request is to modify a table name of a data table A, and then the application client 101 invokes an Application Programming Interface (API) provided by the distributed clustered database system to transmit the DDL request to the gateway server 102. For example, the API can be a MySQL API (an API provided by a relational database system). For another example, in a smart traffic scenario, a request for adding parking lots is a DDL request, and a request for querying existing parking lots is a DML request.

In some embodiments, the gateway server 102 may be combined with any one of the computing devices in the distributed storage cluster 103 on the same physical machine, that is, a computing device in the distributed storage cluster 103 acts as the gateway server 102.

The distributed storage cluster 103 includes one or more computing devices. For some data requests, such as a DDL request, a global lock needs to be added to the DDL request when the DDL request is executed, to ensure the correctness of an operation of a DDL transaction corresponding to the DDL request. A computing device that processes the DDL request is referred to as a first computing device, and other computing devices except the first computing device are referred to as second computing devices. In some embodiments, the division of the first computing device and the second computing devices is for different DDL requests, and the number of the second computing devices may be one or more. This embodiment does not make a specific restriction on the number of computing devices in the distributed storage cluster 103. For example, the number of computing devices is m, and m is an integer greater than or equal to 1.

In some embodiments, each computing device adopts a main/standby structure (namely, a cluster with one main unit and a plurality of standby units). As shown in FIG. 1, a computing device being a one-main-unit two-standby-unit cluster is taken as an example. Each computing device includes one main unit and two standby units. In some embodiments, each main unit or standby unit is correspondingly configured with an agent device which may be physically independent from the main unit or standby unit. Of course, the agent device can also serve as an agent module on the main unit or standby unit. Computing device 1 is taken as an example. Computing device 1 includes a main database and an agent device (main database+agent, referred to as main DB+agent), and further includes two standby databases and an agent device (standby database+agent, referred to as standby DB+agent).

In one scenario, a database instance set of the main unit or standby unit corresponding to each computing device is referred to as an SET. For example, if a computing device is a stand-alone device, the SET of the computing device is only a database instance of the stand-alone device, and if a computing device is a one-main-unit two-standby-unit cluster, the SET of the computing device is a set of a database instance of the main unit and database instances of the two standby units.

In some embodiments, the distributed clustered database system composed of the above gateway server 102 and the distributed storage cluster 103 can be considered as a server for providing a data service to a user terminal. The server may be an independent physical server, or may be a server cluster or a distributed system formed by a plurality of physical servers, or may be a cloud server that provides basic cloud computing services such as cloud services, cloud databases, cloud computing, cloud functions, cloud storage CDN services, cloud communication, middleware services, domain name services, security services, Content Delivery Networks (CDNs), big data, and artificial intelligence platforms.

Figure 2:
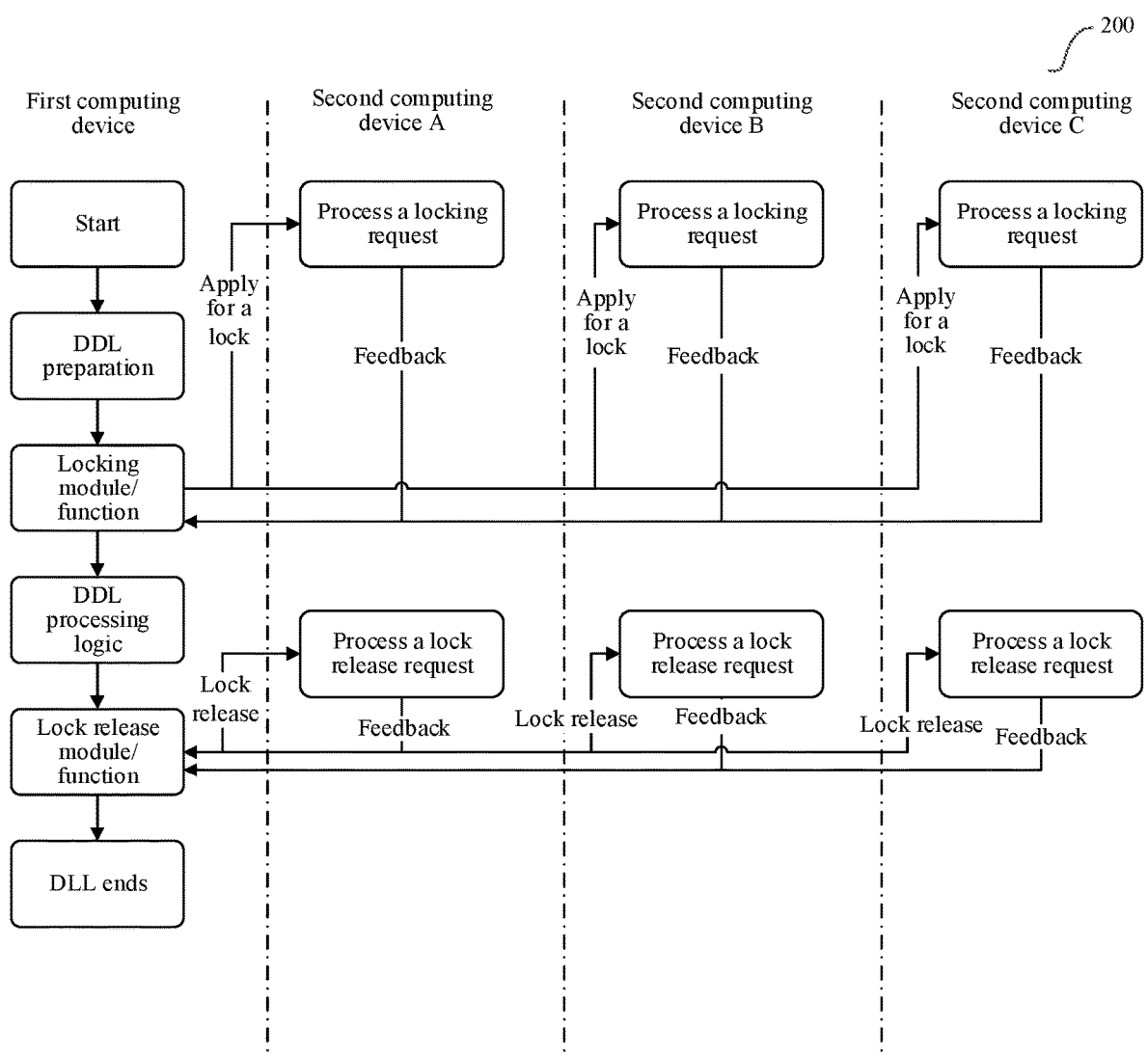
FIG. 2 is a schematic diagram of a principle of a lock synchronization mechanism model provided according to an embodiment of this application.

A distributed clustered database is taken as an example below to describe a lock synchronization mechanism model provided according to an embodiment of this application. FIG. 2 is a schematic diagram of a principle of a lock synchronization mechanism model provided according to an embodiment of this application. As shown in 200, the distributed clustered database includes a first computing device and three second computing devices A, B, and C. It is assumed that the first computing device receives a DDL request at a certain moment. The DDL request needs to be locked in the distributed clustered database to ensure the correctness of operations. A strong synchronization mode is taken as an example. In the strong synchronization mode, locks for a data resource corresponding to the DDL request need to be applied on the first computing device and the second computing devices A, B, and C. After all the computing devices apply for the locks successfully, a processing logic of the DDL request is executed, namely, corresponding DDL transactions are completed. The first computing device releases the lock of the current DDL request, and notifies the second computing devices A, B, and C to also release the locks of the current DDL request. The overall lock synchronization process is described in detail below:

Step I. The first computing device begins to process the DDL request.

Step II. The first computing device performs DDL preparation. For example, local lock application is completed for local data resources needing to be locked.

Step III. The first computing device transmits a locking application to the second computing devices A, B, and C respectively via a locking module or a locking function, and the second computing devices A, B, and C separately process the locking application and return locking feedback information to the first computing device.

Step IV. The first computing device executes a DDL processing logic, for example, executing a DDL transaction corresponding to the DDL request.

Step V. The first computing device transmits a lock release application to the second computing devices A, B, and C respectively via a lock release module or a lock release function, and the second computing devices A, B, and C separately process the lock release application and return lock release feedback information to the first computing device.

Step VI. The first computing device ends the process of processing the DDL request (referred to as a DDL process).

In the above process, it can be seen that only adding the locking module or the locking function to the first computing device can ensure that a lock of a certain DDL request can be synchronized to the other second computing devices in the current cluster. For example, after receiving a locking request, each second computing device leads to applying for a lock locally, and returns locking feedback information to a remote node (namely, the first computing device) that applies for the lock. At the same time, in the lock release process, a lock owner (namely, the first computing device that initiates the locking request) first transmits a lock release request to other second computing devices in the current cluster. After receiving the lock release request, each second computing device releases the corresponding lock locally, and returns lock release feedback information to the remote node (namely, the first computing device).

Figure 3:
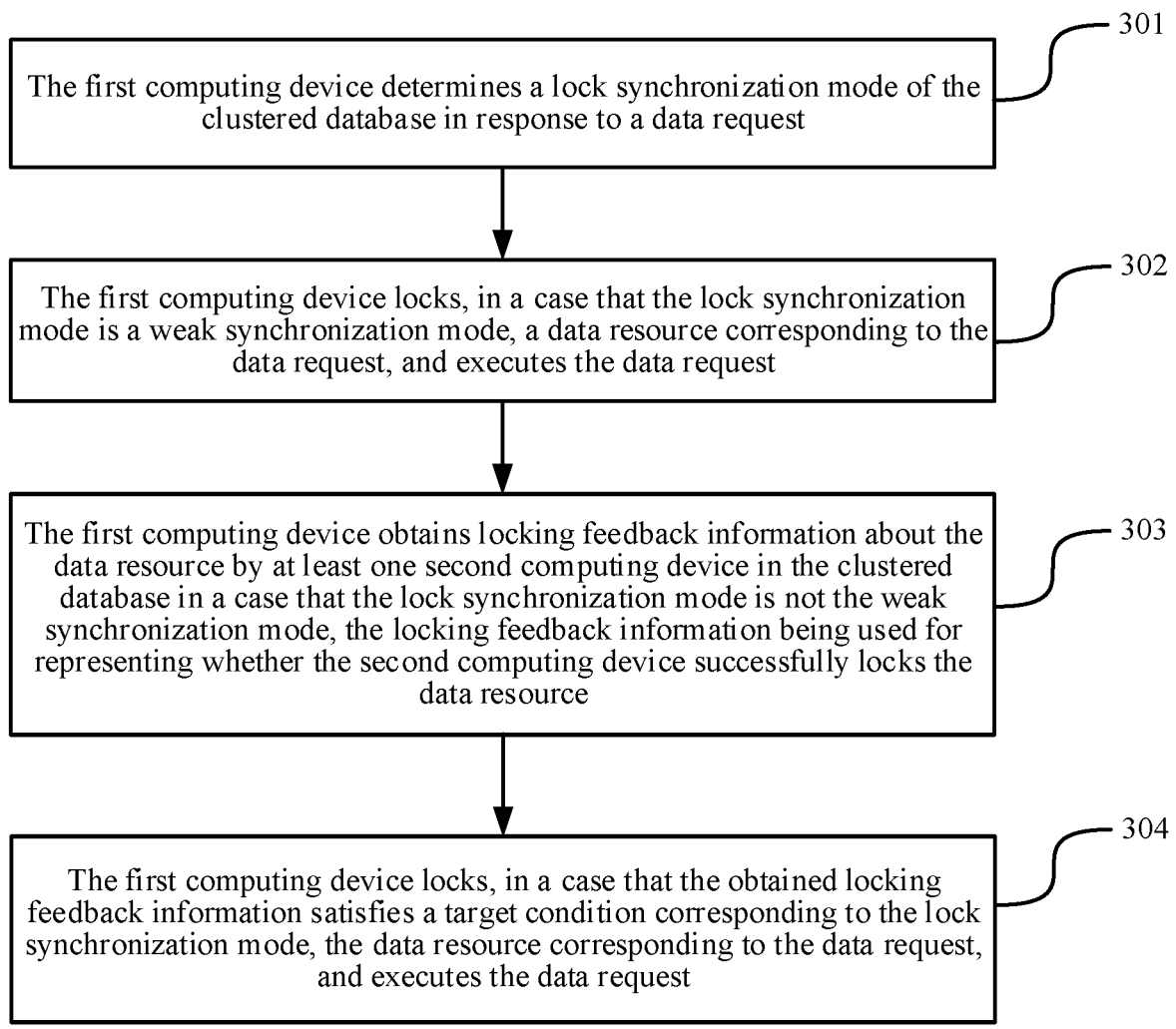
FIG. 3 is a flowchart of a request processing method provided according to an embodiment of this application.

In the above embodiment, a general framework of the lock synchronization mechanism model is briefly introduced. Various operations of the first computing device in the locking process will be described in this embodiment. FIG. 3 is a flowchart of a request processing method provided according to an embodiment of this application. Referring to FIG. 3, this embodiment is performed by a first computing device in a clustered database. This embodiment includes the following steps:

301. The first computing device determines a lock synchronization mode of the clustered database in response to a data request.

In some embodiments, the clustered database can be applied to the request processing method no matter it is a centralized clustered database or a distributed clustered database, and this embodiment only takes the distributed clustered database as an example for explanation. The clustered database includes a first computing device and second computing devices. The first computing device refers to a computing device configured to process the data request, and all computing devices in a cluster except the first computing device are referred to as the second computing devices.

In some embodiments, a user may log in to an application client on a terminal, and triggers the application client to generate the data request. In some embodiments, the data request is a DDL request, or the data request is a DML request. In this embodiment, a DDL request serving as the data request is taken as an example. For example, the DDL request is to modify the table name of a data table A. The application client may invoke, after generating the data request, an API to transmit the data request to the first computing device.

In some embodiments, the first computing device receives the data request, parses a header field of the data request, and determines a lock synchronization mode of the clustered database when the header field indicates that the data request is a specified type of request, such as a DDL request.

In some embodiments, the lock synchronization mode may be indicated by a lock synchronization mode parameter lock_level_mode configured by the database system (or a database engine). The lock synchronization mode parameter lock_level_mode is used for representing a lock synchronization mode in which the clustered database is currently located. The lock synchronization mode includes but is not limited to a strong synchronization mode (Strong), a semi-strong synchronization mode (Middle), and a weak synchronization mode (Feak). The first computing device may query a value of the lock synchronization mode parameter lock_level_mode from a configuration file, determine, if the lock synchronization mode parameter lock_level_mode indicates Strong, that the lock synchronization mode is a strong synchronization mode, determine, if the lock synchronization mode parameter lock_level_mode indicates Middle, that the lock synchronization mode is a semi-strong synchronization mode, and determine, if the lock synchronization mode parameter lock_level_mode indicates Feak, that the lock synchronization mode is a weak synchronization mode.

In some embodiments, the lock synchronization mode parameter lock_level_mode as described above is added to the configuration file that is loaded by the database engine of each computing device in the cluster upon startup of the clustered database.

In some embodiments, the lock synchronization mode parameter lock_level_mode may also be randomly modified by a computing device when the whole cluster is running. After completing the modification of the lock synchronization mode parameter lock_level_mode, the computing device may automatically synchronize the modified lock synchronization mode parameter lock_level_mode to all the computing devices in the cluster.

In some embodiments, if the first computing device determines that the lock synchronization mode is the weak synchronization mode, following step 302 is performed. If the first computing device determines that the lock synchronization mode is the strong synchronization mode or the semi-strong synchronization mode, following steps 303-304 are performed.

In other embodiments, after locally completing the local lock application from the data resource needing to be locked, the first computing device enters the locking process, and then determines whether the lock synchronization mode is the weak synchronization mode. If the lock synchronization mode is the weak synchronization mode, the following step 302 is performed. If the lock synchronization mode is not the weak synchronization mode, the following steps 303-304 are performed.

302. The first computing device locks, when the lock synchronization mode is a weak synchronization mode, a data resource corresponding to the data request, and executes the data request.

If the lock synchronization mode is the weak synchronization mode, the first computing device can directly advance the current data request, such as the DDL request, without applying for locks from the other second computing devices. The correctness of operations can be guaranteed by a specific mechanism, namely, Writing Fence. By using the above mechanism, it can be guaranteed that only one thread can enter a critical region code at a certain time point in a multi-core multi-thread environment, so as to guarantee the consistency of operation data in a critical section.

The "lock" involved in this embodiment may be understood as an internal memory state parameter in an internal memory. For example, the internal memory state parameter may be an integer number. The internal memory state parameter is associated with the data resource and represents whether to lock the associated data resource.

In some embodiments, the internal memory state parameter has two states: an idle state and a locked state. During locking, whether a lock is idle is determined; if the lock is idle, the state is modified to the locked state; and the first computing device itself turns into a lock owner, and returns a lock application success. If it is already locked, the first computing device returns a lock application failure. During unlocking, the locked state is modified to the idle state.

In some embodiments, the internal memory state parameter may have more than two states: an idle state, read lock (namely, shared lock, S lock), write lock (namely, exclusive lock, X lock), and update lock. The read lock, the write lock, and the update lock are used for distinguishing operations that other DML requests can perform on the locked data resource in the locked state. For example, a certain DDL request locks a user table T1 with T1_lock. If T1_lock is the read lock, other DML requests can still normally read data items in the user table T1 although a writing operation cannot be performed on the user table T1.

In the weak synchronization mode, due to the guarantee of the writing fence mechanism, after the local lock application succeeds, the first computing device can directly consider that a lock has been obtained, that is, the first computing device turns into the lock owner, which does not need to transmit a locking application to the various other second computing devices, and can determine that the locking of the data resource corresponding to the data request succeeds. The locking process ends, and then the first computing device executes a database transaction corresponding to the data request. For example, a DDL transaction corresponding to the DDL request is executed by using a DDL thread.

303. The first computing device obtains locking feedback information about the data resource by at least one second computing device in the clustered database when the lock synchronization mode is not the weak synchronization mode, the locking feedback information being used for representing whether the second computing device successfully locks the data resource.

If the lock synchronization mode is not the weak synchronization mode, the lock synchronization mode may be a strong synchronization mode or a semi-strong synchronization mode. In the above strong synchronization mode or semi-strong synchronization mode, the first computing device needs to apply for a lock from the various remote second computing devices, and only target conditions of the two modes for determining a lock application success are different. In the strong synchronization mode, it is not considered that a global application for the lock of the data resource succeeds until all the second computing devices are required to apply for a lock successfully. In the semi-strong synchronization mode, it can be considered that the global application for the lock of the data resource succeeds if a target number or larger number of second computing devices apply for the lock successfully.

In some embodiments, the first computing device applies for a lock from the various second computing devices, to obtain the locking feedback information of the various second computing devices. In some embodiments, the locking feedback information includes: a locking success and a locking failure. There are usually various reasons for a locking failure: waiting timeout, deadlock, and the like.

In some embodiments, the above process of applying for a lock from the various second computing devices includes: The first computing device transmits a locking request associated with the data request to the at least one second computing device; and the first computing device receives the locking feedback information returned by the at least one second computing device on the basis of the locking request.

In some embodiments, on the first computing device and each second computing device, a message processing thread can be created in the background. The message processing thread can be specially used for processing various messages related to a locking mechanism, for example, monitoring locking requests, lock release requests, locking feedback information, lock release feedback information, and the like, of other computing devices, to timely receive and transmit the various messages related to the locking mechanism and ensure the communication performance between the computing devices.

Based on the above situation, when transmitting the locking request, the first computing device may transmit the locking request to a message processing thread on the at least one second computing device respectively via a message processing thread on the first computing device. Similarly, when receiving the locking feedback information, the first computing device may receive, via the message processing thread on the first computing device, the locking feedback information returned by the message processing thread on the at least one second computing device. The lock application process of the second computing device will be described in detail in the next embodiment and will not be described here.

In some embodiments, since the first computing device may transmit the locking request to each second computing device in the cluster, and time at which the locking feedback information of each second computing device is returned to the first computing device may be different. In some embodiments, if a processing process (such as a DDL process) of the data request on the first computing device crashes, after the DDL process crashes, the first computing device should timely instruct, according to the received locking feedback information, the second computing device that succeeds in locking to release the corresponding lock, which avoids blocking other DML, processes on the data resource to optimize the processing performance of the clustered database.

With regard to the above situation, the first computing device may transmit, in response to receiving the locking feedback information of any second computing device, the locking feedback information to a lock application thread of the data request via the message processing thread when the data request is in an active state; and the first computing device transmits a lock release request to the second computing device when the data request is not in an active state and that the locking feedback information represents a locking success, the lock release request being used for instructing the second computing device to release the data resource corresponding to the data request.

In some embodiments, after receiving any locking feedback information via the message processing thread, the first computing device determines whether the local data request is active. A DDL request is taken as an example, and it can be determined whether a DDL process corresponding to the DDL request exists. Since there may be a case where a plurality of DDL requests multiplex the same DDL process, resulting in that the DDL process may still exist when the current DDL request has failed (for example, a target condition is not satisfied, and the DDL transaction is rolled back), there may be a certain misjudgment in determining whether the DDL request is active with regard to the DDL process. In some embodiments, it can also be directly determined whether the DDL transaction corresponding to the DDL request is in an active state, which can effectively reduce the above misjudgment and improve the judgment accuracy.

If the data request is not active, namely, if the data request is not in an active state, whether the locking feedback information represents a locking success is determined. If the locking feedback information represents a locking success, it is indicated that the local DDL request has ended, but the lock of the corresponding data resource has been applied successfully from the remote second computing device, and at this moment, the second computing device needs to be instructed to release the lock of the corresponding data resource in time. Therefore, the first computing device can transmit the lock release request to the message processing thread of the second computing device via the message processing thread of the first computing device, to instruct the second computing device to release the data resource corresponding to the data request, for example, to modify the internal memory state parameter of the lock corresponding to the data resource to the idle state. In addition, no processing is required if the locking feedback information represents a locking failure, which means that the remote side does not need to release the data resource in time.

If the data request is active, namely, if the data request is in an active state, the locking feedback information can be transmitted to the lock application thread of the data request via the message processing thread, so that the lock application thread records the locking feedback information received this time, and determines, on the basis of following step 304, whether the locking feedback information satisfies a target condition, thereby facilitating the lock application thread to timely count whether the received locking feedback information satisfies a target condition corresponding to the current lock synchronization mode.

In some embodiments, the first computing device may also start time counting after transmitting the locking request to the various second computing devices. This time counting operation counts a waiting duration for each piece of locking feedback information, and a first waiting threshold corresponding to the strong synchronization mode and a second waiting threshold corresponding to the semi-strong synchronization mode may be configured in the configuration file. The first waiting threshold is used for representing a maximum waiting duration for the locking feedback information of a computing device in the strong synchronization mode. If the waiting duration in the strong synchronization mode exceeds the first waiting threshold, it can be directly considered that this locking fails, and a lock release request is transmitted to the various second computing devices that succeed in lock application, to instruct the second computing devices to release the data resource corresponding to the data request, and then the locking process ends. The first waiting threshold is any value greater than 0, for example, the first waiting threshold is 15 s. The second waiting threshold is used for representing a maximum waiting duration for the locking feedback information of a computing device in the semi-strong synchronization mode. If the waiting duration in the semi-strong synchronization mode exceeds the second waiting threshold, it can be directly considered that this locking fails, and a lock release request is transmitted to the various second computing devices that succeed in lock application, to instruct the second computing devices to release the data resource corresponding to the data request, and then the locking process ends. The second waiting threshold is any value greater than 0, for example, the second waiting threshold is 10 s. The first waiting threshold and the second waiting threshold may be the same or different. This embodiment does not limit this.

In the above process, by configuring the first waiting threshold and the second waiting threshold, and starting time counting after the locking request is transmitted, the first computing device will not wait for locking feedback information of other second computing devices for a long time, for example, packet loss in the transmission of the locking feedback information can be avoided. At this time, the waiting duration of the first computing device in the strong synchronization mode reaches the first waiting threshold at most, and the waiting duration in the semi-strong synchronization mode reaches the second waiting threshold at most; and processing other subsequent data requests can be advanced, and the performance of the clustered database can be improved.

304. The first computing device locks, when the obtained locking feedback information satisfies a target condition corresponding to the lock synchronization mode, the data resource corresponding to the data request, and executes the data request.

The target condition corresponding to the lock synchronization mode is a condition used for evaluating, according to the obtained locking feedback information, whether to lock the data resource corresponding to the data request. Usually, a target condition corresponding to a strong synchronization mode has a higher requirement than a target condition corresponding to a semi-strong synchronization mode.

In some embodiments, if no timeout mechanism is configured in the clustered database, when the lock synchronization mode is the strong synchronization mode, the target condition is that the locking feedback information of the at least one second computing device represents a locking success. When the lock synchronization mode is the semi-strong synchronization mode, the target condition is that the locking feedback information of a target number or a larger number of second computing devices among the at least one second computing device represents a locking success.

In some embodiments, if a timeout mechanism is configured in the clustered database, in addition to the above basic conditions being satisfied, it also needs to ensure that the waiting duration in the strong synchronization mode does not exceed the first waiting threshold and the waiting duration in the semi-strong synchronization mode does not exceed the second waiting threshold, that is, when the lock synchronization mode is the strong synchronization mode, the target condition is that the waiting duration does not exceed the first waiting threshold, and the locking feedback information of the at least one second computing device represents a lock success. When the lock synchronization mode is the semi-strong synchronization mode, the target condition is that the waiting duration does not exceed the second waiting threshold and the locking feedback information of a target number or larger number of second computing devices among the at least one second computing device represents a locking success. The first waiting threshold and the second waiting threshold are both values greater than 0, and the first waiting threshold and the second waiting threshold can both be added to the configuration file, and are loaded by the database engine of each computing device when the clustered database is started.

In some embodiments, the target number may be indicated by a locking success probability parameter lock_succ_node_num configured by the database engine, and the locking success probability parameter lock_succ_node_num is used for representing how many computing devices in total in the clustered database apply for a lock successfully in the semi-strong synchronization mode to achieve a global lock application success. In some embodiments, the locking success probability parameter lock_succ_node_num is equal to the target number plus one. The target number represents a total desired number of the second computing devices that achieves a lock application success, and the target number plus the first computing device is equal to a total desired number of computing devices in the cluster that achieves a lock application success. A valid value range of the locking success probability parameter lock_succ_node_num is greater than or equal to 1, and less than or equal to the number of all the computing devices in the cluster. If the locking success probability parameter lock_succ_node_num is less than 1 or greater than the number of all the computing devices in the cluster, it indicates that at this moment, the locking success probability parameter lock_succ_node_num of the cluster is not within the valid value range, and it can be considered that the strong synchronization mode or the weak synchronization mode is always used (set by an administrator), to ensure that the cluster can be run normally when the locking success probability parameter lock_succ_node_num is invalid. For example, a strong synchronization mode is always used.

In some embodiments, the locking success probability parameter lock_succ_node_num can also be added in the configuration file that is loaded the database engine of each computing device in the cluster upon startup of the clustered database.

In some embodiments, the locking success probability parameter lock_succ_node_num can also be randomly modified by a computing device during the running of the whole cluster. After completing the modification of the locking success probability parameter lock_succ_node_num, the computing device may automatically synchronize the modified locking success probability parameter lock_succ_node_num to all the computing devices in the cluster.

In some embodiments, the first computing device obtains the target number when the lock synchronization mode is the semi-strong synchronization mode. The lock synchronization mode is switched to the strong synchronization mode when the target number is less than one or greater than the number of all the second computing devices in the clustered database.

In the above process, the first computing device may query the value of the locking success probability parameter lock_succ_node_num from the configuration file, and determine a value obtained by subtracting one from the value of the locking success probability parameter lock_succ_node_num as the target number. Further, whether the target number is valid is determined. That is, if the target number is greater than or equal to 1, and is less than or equal to the number of all the second computing devices in the clustered database, it indicates that the target number is valid, and the target condition is determined according to the semi-strong synchronization mode. If the target number is less than 1, or is greater than the number of all the second computing devices in the clustered database, it indicates that the target number is invalid, and the lock synchronization mode can be forced to be switched to the strong synchronization mode. In some embodiments, the lock synchronization mode may also be forced to be switched to the weak synchronization mode. This embodiment does not limit this.

In some other embodiments, after obtaining the value of the locking success probability parameter lock_succ_node_num by querying the configuration file, the first computing device determines whether the value of the locking success probability parameter lock_succ_node_num is valid. If the locking success probability parameter lock_succ_node_num is valid (namely, if it is greater than or equal to 1 and less than or equal to the number of all the computing devices in the cluster), it represents that the target number is also valid. If the locking success probability parameter lock_succ_node_num is invalid (namely, if it is less than 1, or is greater than the number of all the computing devices in the cluster), it represents that the target number is also invalid, and the lock synchronization mode needs to be forced to be switched to the strong synchronization mode or the weak synchronization mode. In this embodiment, switching the lock synchronization mode to the strong synchronization mode is illustrated as an example only.

In some embodiments, if the lock synchronization mode parameter lock_level_mode does not indicate Feak, it represents that the lock synchronization mode is not the weak synchronization mode. At this time, a locking application is transmitted to the various second computing devices via a message processing thread, and time counting is started. Locking feedback information returned by the various second computing devices is received via the message processing thread. In some embodiments, if the lock synchronization mode parameter lock_level_mode indicates Strong, which determines that the lock synchronization mode is the strong synchronization mode, whether the locking feedback information of all the second computing devices represents a locking success is determined. At this moment, this situation can be discussed in three cases: 1) If waiting timeout does not occur, namely, if the waiting duration does not exceed the first waiting threshold, and the received locking feedback information of all the second computing devices represents a locking success, the target condition is satisfied, which means a global locking success. 2) If the received locking feedback information of any second computing device represents a locking failure, the target condition is not satisfied, which means a global locking failure. 3) If there is a second computing device that does not return the locking feedback information at the waiting duration that exceeds the first waiting threshold, it represents that waiting timeout occurs, and the target condition is not satisfied, which means a global locking failure.

In some embodiments, if the lock synchronization mode parameter lock_level_mode indicates Middle, which determines that the lock synchronization mode is the semi-strong synchronization mode, the locking success probability parameter lock_succ_node_num is read from the configuration file, and whether the locking success probability parameter lock_succ_node_num is valid is determined. If the locking success probability parameter lock_succ_node_num is greater than or equal to 1 and less than or equal to the number of all the computing devices in the cluster, namely, if the locking success probability parameter lock_succ_node_num is valid, processing continues according to the semi-strong synchronization mode; and if the locking success probability parameter lock_succ_node_num is less than 1, or is greater than the number of all the computing devices in the cluster, processing continues according to the strong synchronization mode. In the semi-strong synchronization mode, this situation can also be discussed in three cases: A) If waiting timeout does not occur, namely, if the waiting duration does not exceed the second waiting threshold, and the received locking feedback information represents that the number of second computing devices that succeeds in locking is greater than or equal to the target number, the target condition is satisfied, which means a global locking success. In another possible implementation, if the received locking feedback information represents that the number of second computing devices that succeeds in locking plus one is greater than or equal to the locking success probability parameter lock_succ_node_num, it is also determined that the target condition is satisfied, which means a global locking success. B) If the received locking feedback information represents that the number of second computing devices that fails in locking is greater than a value obtained by subtracting the target number from the number of all the second computing devices in the cluster, the target condition is not satisfied, which means a global locking failure. In another possible implementation, if the received locking feedback information represents that a value obtained by adding the number of second computing devices that fails in locking with one is greater than a value obtained by subtracting the locking success probability parameter lock_succ_node_num from the number of all the computing devices in the cluster, it is also determined that the target condition is not satisfied, which means a global locking failure. C) If there are more second computing devices that do not return the locking feedback information at the waiting duration that exceeds the second waiting threshold, causing that neither case A) nor case B) is satisfied, it represents that waiting timeout occurs, and the target condition is not satisfied, which means a global locking failure.

In some embodiments, if it is determined that the obtained locking feedback information satisfies the target condition, an operation similar to step 302 described above is performed. That is, the data resource corresponding to the data request is locked, and the data request is executed, which will not be described in detail here.

In some embodiments, when the obtained locking feedback information does not satisfy the target condition, or the execution of the data request is completed, a lock release request is transmitted to the at least one second computing device. The lock release request is used for instructing the second computing device to release the data resource corresponding to the data request.

In the above-mentioned process, if the obtained locking feedback information does not satisfy the target condition, global locking fails at this moment, but it is very likely that the current data request has applied for the lock successfully from some second node devices. Therefore, the first computing device needs to transmit the lock release request to the various second computing devices with the locking feedback information indicating a locking success, thereby releasing the locks of the corresponding data resources in time. In some embodiments, the lock release request may also be directly broadcast to all the second computing devices, and the second computing devices that succeed in locking will release the locks of the corresponding data resources, but the second computing devices that fail in locking will not perform any processing.

In some embodiments, the first computing device does not need to wait for the various second computing devices to return lock release feedback information, which is guaranteed by an active lock information detection mechanism in the following embodiments, to improve the request processing efficiency of the system. Of course, the first computing device may also wait for the various second computing devices to return the lock release feedback information before completing the locking process, and timely detect whether some second computing devices fail to receive the lock release request due to network packet loss. This embodiment does not limit this. In another scenario, if the obtained locking feedback information satisfies the target condition, after the first computing device performs the global locking successfully and completes the execution of the data request, such as the DDL request, the first computing device also needs to notify other second computing devices to release the locks of the corresponding data resources in time. The transmission manner of the lock release request is similar to the above-mentioned case, and will not be described in detail here.

All the above technical solutions can be used in any combination to form the embodiments of this application, which will not be described in detail here.

According to the method provided in this embodiment, by setting a plurality of flexible levels for lock synchronization modes, in a weak synchronization mode, a data resource corresponding to a data request is directly locked, and the data request is executed, which can ensure that the data request is advanced preferentially, without waiting for a response of a second computing device. In a non-weak synchronization mode, locking feedback information of various second computing devices is obtained. When the obtained locking feedback information satisfies a target condition, the data resource is locked, and the data request is executed. Different lock synchronization modes can be selected in different service scenarios, thereby ensuring that a clustered database can meet processing requirements of different service scenarios, which improves the processing capability of a clustered database system.

In the above-mentioned embodiments, how a first computing device initiates a locking request in a request processing process and determines, on the basis of locking feedback information, whether a target condition is satisfied during a request processing process is introduced. In this embodiment, message interaction between the first computing device and a second computing device during locking and respective local locking logics are described in detail.

Figure 4:
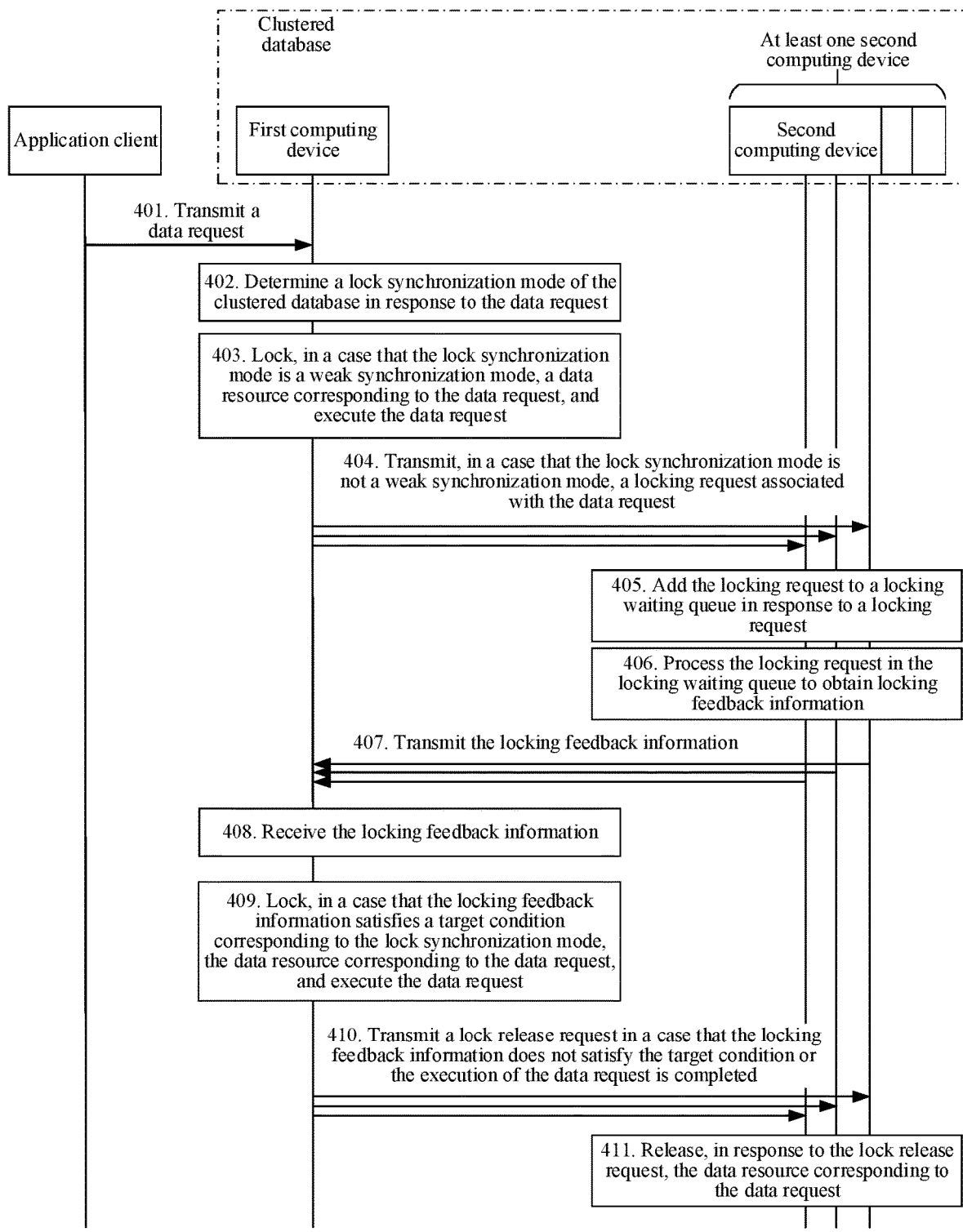
FIG. 4 is a flowchart of interaction of a request processing method provided according to an embodiment of this application.

FIG. 4 is a flowchart of interaction of interaction of a request processing method provided according to an embodiment of this application. As shown in FIG. 4, this embodiment is applied to the clustered database which includes a first computing device and at least one second computing device. The first computing device refers to a computing device configured to process a data request, and all computing devices in a cluster except the first computing device are referred to as second computing devices. This embodiment includes the following steps:

401. An application client transmits a data request to the first computing device in the clustered database.

In some embodiments, the clustered database can be applied to the request processing method no matter it is a centralized clustered database or a distributed clustered database, and this embodiment only takes the distributed clustered database as an example for explanation.

In some embodiments, a user logs in to the application client on a terminal, and triggers the application client to generate the data request. In some embodiments, the data request is a DDL request, or the data request is a DML request. In this embodiment, a DDL request serving as the data request is taken as an example. For example, the DDL request is to modify the table name of a data table A. The application client may invoke, after generating the data request, an API to transmit the data request to the first computing device.

402. The first computing device determines a lock synchronization mode of the clustered database in response to the data request.

The above-mentioned step 402 is similar to the above-mentioned step 301, and will not be described in detail here.

403. The first computing device locks, when the lock synchronization mode is a weak synchronization mode, a data resource corresponding to the data request, and executes the data request.

The above-mentioned step 403 is similar to the above-mentioned step 302, and will not be described in detail here.

404. The first computing device transmits, when the lock synchronization mode is not a weak synchronization mode, a locking request associated with the data request to the at least one second computing device in the clustered database.

If the lock synchronization mode is not the weak synchronization mode, the lock synchronization mode may be a strong synchronization mode or a semi-strong synchronization mode. In the above strong synchronization mode or semi-strong synchronization mode, the first computing device needs to apply for a lock from all the remote second computing devices, and only target conditions of the two modes for determining a lock application success are different. In the strong synchronization mode, it is not considered that a global application for the lock of the data resource succeeds until all the second computing devices are required to apply for a lock successfully. In the semi-strong synchronization mode, it can be considered that the global application for the lock of the data resource succeeds if a target number or larger number of second computing devices apply for the lock successfully.

In some embodiments, the first computing device applies for a lock from the various second computing devices, to obtain the locking feedback information of the various second computing devices. In some embodiments, the locking feedback information includes: a locking success and a locking failure. There are usually various reasons for a locking failure: waiting timeout, deadlock, and the like.

In some embodiments, on the first computing device and each second computing device, a message processing thread can be created in the background. The message processing thread can be specially used for processing various messages related to a locking mechanism, for example, monitoring locking requests, lock release requests, locking feedback information, lock release feedback information, and the like, of other computing devices, to timely receive and transmit the various messages related to the locking mechanism and ensure the communication performance between the computing devices.

Based on the above, the first computing device, when transmitting the locking request, may transmit the locking request to the message processing thread on the at least one second computing device via the message processing thread on the first computing device, respectively.

405. Any second computing device adds the locking request to a locking waiting queue in response to a locking request associated with the data request.

The locking request is transmitted by the first computing device in the clustered database when the lock synchronization mode is not the weak synchronization mode.

In some embodiments, the second computing device receives the locking request via the message processing thread; starts a lock agent thread corresponding to the locking request via the message processing thread; and adds the locking request to the locking waiting queue via the lock agent thread. In some embodiments, each locking request corresponds to one lock agent thread, to reduce a waiting delay of each locking request. In some embodiments, a plurality of locking requests may multiplex the same lock agent thread. At this time, locking requests arriving later need to be stored in the locking waiting queue. The various locking request stored in the locking waiting queue are processed by the lock agent thread in sequence.

In the above process, the message processing threads specially used for transmitting and receiving the lock-related messages are configured on both the first computing device and the second computing device, so that the message processing threads can start the lock agent thread to maintain a life cycle of a remote lock on each second computing device. In addition, there may be a following case: when the locking feedback information of the second computing device arrives at the first computing device, the lock application thread on the first computing device has exited. At this time, because of the configuration of the message processing threads, the message processing thread of the first computing device can determine, by the following operation in step 408, whether the current data request is active and whether the locking feedback information represents a locking success, to timely return, when the data request is not active, a lock release request to a second computing device that succeeds in locking and to trigger the remote lock that has been applied successfully, to achieve the objective of not blocking services on the second computing device.

406. The second computing device processes the locking request in the locking waiting queue to obtain locking feedback information, the locking feedback information being used for representing whether the second computing device successfully locks the data resource.

In some embodiments, the second computing device initiates a local lock agent thread and invokes a local lock application logic to process the various locking request cached in the locking waiting queue. The lock agent thread traverses the locking waiting queue. If locking of data resources corresponding to the data request transmitted by the first computing device at this time is completed, it indicates that the locking request has been processed, and the locking feedback information is determined as a locking success. Otherwise, it is necessary to continue to wait in the locking waiting queue, and the locking feedback information is determined as a locking failure until waiting timeout or a deadlock occurs. That is, when the waiting duration of the locking request in the locking waiting queue exceeds a third waiting threshold or deadlock detection fails, the locking feedback information is determined as the locking failure. The third waiting threshold is any value greater than 0. For example, the third waiting threshold is 5 s. The third waiting threshold may also be added to the configuration file and is loaded by the database engine of each computing device upon startup of the clustered database.

In the above process, it can be seen that there are at least two cases for a locking failure: a) If waiting timeout occurs, namely, if a cache duration of the locking request in the locking waiting queue exceeds the third waiting threshold, it can be considered as a locking failure. b) If deadlock detection fails, indicating that a deadlock is found in the deadlock detection and a second computing device itself is selected as a deadlock victim, the lock application cannot be completed.

In some embodiments, a deadlock detection process for the second computing device is as follows: The second computing device performs local deadlock detection on the locking request in response to a deadlock detection message of the first computing device; determines, when the lock deadlock detection fails, that the deadlock detection fails; determines a lock waiting chain of the locking request when the lock deadlock detection succeeds, the lock waiting chain including lock information that has a dependency relationship with the locking request; transmits, when the lock waiting chain includes a remote lock, the deadlock detection message to a third computing device that initiates the remote lock, the remote lock being lock information that has been registered in the second computing device but is not initiated by the second computing device; and when any computing device that transmits the deadlock detection message receives the deadlock detection message, determines that the deadlock detection fails.

In some embodiments, the deadlock detection message may be initiated by the first computing device. For example, the first computing device has not received the locking feedback information of each second computing device for a long time, but no waiting timeout occurs at this time, the message processing thread of the first computing device may transmit the deadlock detection message to the message processing thread of the second computing device. The second computing device first performs the local deadlock detection when receives the deadlock detection message. If the local deadlock detection fails, the second computing device does not need to traverse the lock waiting chain, but directly returns the locking feedback information to the first computing device. The locking feedback information indicates a locking failure, and a failure type is that the second computing device is selected as a deadlock victim. If the local deadlock detection succeeds, but it still cannot completely ensure that there is no deadlock at this moment, the second computing device still needs to traverse the corresponding lock waiting chain, and determines whether each lock in the lock waiting chain is a remote lock is determined. If the lock is a remote lock, the second computing device transmits a deadlock detection message to a lock owner (namely, a third computing device) of the remote lock, and triggers the third computing device to execute a deadlock detection process similar to that of the second computing device. That is, the third computing device first performs local deadlock detection, then traverses remote locks in the lock waiting chain, and transmits a deadlock detection message again. If any computing device itself, as a transmitting end of a deadlock detection message, receives the same deadlock detection message transmitted by other computing devices, it is indicated that a deadlock occurs. This computing device returns locking feedback information to the first computing device. The locking feedback information indicates a locking failure, and a failure type is that the computing device is selected as a deadlock victim. For example, the first computing device transmits a deadlock detection message to the second computing device, and the second computing device determines that there is a remote lock on the lock waiting chain, and a lock owner of the remote lock is the first computing device. The second computing device transmits the deadlock detection message to the first computing device. At this moment, a dependency ring phenomenon occurs, namely, lock A waits for a lock B, and the lock B waits for the lock A. That is, the first computing device serving as a transmitting end of the deadlock detection message receives the same deadlock detection message transmitted by the second computing device, which indicates that a deadlock is found, and the locking fails this time.

In some embodiments, if the second computing device performs locking successfully, in a case of locking the data resource corresponding to the data request, the lock agent thread of the second computing device registers lock information corresponding to the data request in the message processing thread; determines whether the registered lock information is active lock information at an interval of a target duration; and transmits an active lock information detection request to the first computing device when the lock information is active lock information and a locking duration of the data resource corresponding to the data request exceeds an active lock information detection threshold, the active lock information detection request being used for requesting the first computing device to indicate whether to release the data resource locked by the active lock information. The active lock information detection threshold may be any value greater than 0. For example, the active lock information detection threshold is 20 s.

In the above-mentioned process, if the locking succeeds, the lock agent thread registers the corresponding lock information in the message processing thread, to facilitate the message processing thread to locally manage various successfully applied locks. In addition, the message processing thread can periodically check the active lock information in a registry. If the locking duration exceeds the active lock information detection threshold, the active lock information is still not released, which may be caused by the following several possibilities for example: i) The execution of the data request of the first computing device is completed, but the transmitted lock release request is lost. ii) The lock application thread of the first computing device crashes. iii) The first computing device performs processing normally, but the current data request, such as the DDL transaction, takes long time. At this time, if the active lock information is not released due to the above cases i) and ii), the first computing device can be triggered to transmit a lock release message again by transmitting the active lock information detection request, to instruct the second computing device to release the corresponding lock. If the active lock information is not released due to the above case iii), the second computing device cannot release the corresponding lock, and still needs to maintain the corresponding lock.

407. The second computing device transmits the locking feedback information to the first computing device.

In some embodiments, the message processing thread of the second computing device transmits the locking feedback information to the message processing thread of the first computing device.

Steps 405-407 above describe the process of applying for a remote lock by taking a single second computing device as an example, and operations similar to those in steps 405-407 can be performed on each second computing device in the cluster, which will not be described in detail here.

408. The first computing device receives the locking feedback information returned by the at least one second computing device on the basis of the locking request.

In some embodiments, when receiving the locking feedback information, the first computing device may receive, via the message processing thread on the first computing device, the locking feedback information returned by the message processing thread on the at least one second computing device.

In some embodiments, since the first computing device may transmit the locking request to each second computing device in the cluster, and time at which the locking feedback information of each second computing device is returned to the first computing device may be different. In some embodiments, if a processing process (such as a DDL process) of the data request on the first computing device crashes, after the DDL process crashes, the first computing device should timely instruct, according to the received locking feedback information, the second computing device that succeeds in locking to release the corresponding lock, which avoids blocking other DML, processes on the data resource to optimize the processing performance of the clustered database.

With regard to the above situation, the first computing device may transmit, in response to receiving the locking feedback information of any second computing device, the locking feedback information to a lock application thread of the data request via the message processing thread when the data request is in an active state; and the first computing device transmits a lock release request to the second computing device when the data request is not in an active state and that the locking feedback information is a locking success, the lock release request being used for instructing the second computing device to release the data resource corresponding to the data request.

In some embodiments, after receiving any locking feedback information via the message processing thread, the first computing device determines whether the local data request is active. A DDL request is taken as an example, and it can be determined whether a DDL process corresponding to the DDL request exists. Since there may be a case where a plurality of DDL requests multiplex the same DDL process, resulting in that the DDL process may still exist when the current DDL request has failed (for example, a target condition is not satisfied, and the DDL transaction is rolled back), there is a certain misjudgment in determining whether the DDL request is active with regard to the DDL process. In some embodiments, it can also be directly determined whether the DDL transaction corresponding to the DDL request is in an active state, which can effectively reduce the above misjudgment and improve the judgment accuracy.

If the data request is not active, namely, if the data request is not in an active state, whether the locking feedback information represents a locking success is determined. If the locking feedback information represents a locking success, it is indicated that the local DDL request has ended, but the lock of the corresponding data resource has been applied successfully from the remote second computing device, and at this moment, the second computing device needs to be instructed to release the lock of the corresponding data resource in time. Therefore, the first computing device can transmit the lock release request to the message processing thread of the second computing device via the message processing thread of the first computing device, to instruct the second computing device to release the data resource corresponding to the data request, for example, to modify the internal memory state parameter of the lock corresponding to the data resource to the idle state. In addition, no processing is required if the locking feedback information is a locking failure, which means that the remote side does not have a data resource needing to be released in time.

If the data request is active, namely, if the data request is in an active state, the locking feedback information can be transmitted to the lock application thread of the data request via the message processing thread, so that the lock application thread records the locking feedback information received this time, and determines, on the basis of following step 409, whether the locking feedback information satisfies a target condition, thereby facilitating the lock application thread to timely count whether the received locking feedback information satisfies a target condition corresponding to the current lock synchronization mode.

Steps 404-408 described above show how the first computing device obtains the locking feedback information about the data resource by the at least one second computing device in the clustered database. In some embodiments, the first computing device may also directly transmit the locking request in a broadcast or multicast manner in the clustered database, and receive the locking feedback information returned by the various second computing devices. The first computing device and the second computing devices can directly communicate with each other by a lock application thread on the first computing device and lock agent threads on the second computing devices, without configuring the special message processing threads, which can reduce interthread communication expenses.

409. The first computing device locks, when the obtained locking feedback information satisfies a target condition corresponding to the lock synchronization mode, the data resource corresponding to the data request, and executes the data request.

The above-mentioned step 409 is similar to the above-mentioned step 304, and will not be described in detail here.

410. The first computing device transmits a lock release request to the at least one second computing device when the obtained locking feedback information does not satisfy the target condition, or the execution of the data request is completed.

The lock release request is used for instructing the second computing device to release the data resource corresponding to the data request.

In some embodiments, the message processing thread of the first computing device transmits a lock release request to the message processing threads of the various second computing devices. The transmitting process of the lock release request is the same as the transmitting process of the locking request, and will not be described in detail here.

411. Any second computing device releases, in response to the lock release request associated with the data request, the data resource corresponding to the data request.

In some embodiments, the message processing thread of the second computing device receives the lock release request, and notifies the lock agent thread to release the corresponding data resource. For example, the lock agent thread modifies an internal memory state parameter of a lock to an idle state, and clears corresponding lock information in a registry. So far, the message processing has been completed, and the various received messages are discarded to save a storage space.

All the above technical solutions can be used in any combination to form the embodiments of this application, which will not be described in detail here.

According to the method provided in this embodiment, by setting a plurality of flexible levels for lock synchronization modes, in a weak synchronization mode, a data resource corresponding to a data request is directly locked, and the data request is executed, which can ensure that the data request is advanced preferentially, without waiting for a response of a second computing device. In a non-weak synchronization mode, locking feedback information of various second computing devices is obtained. When the obtained locking feedback information satisfies a target condition, the data resource is locked, and the data request is executed. Different lock synchronization modes can be selected in different service scenarios, thereby ensuring that a clustered database can meet processing requirements of different service scenarios, which improves the processing capability of a clustered database system.

Figure 5:
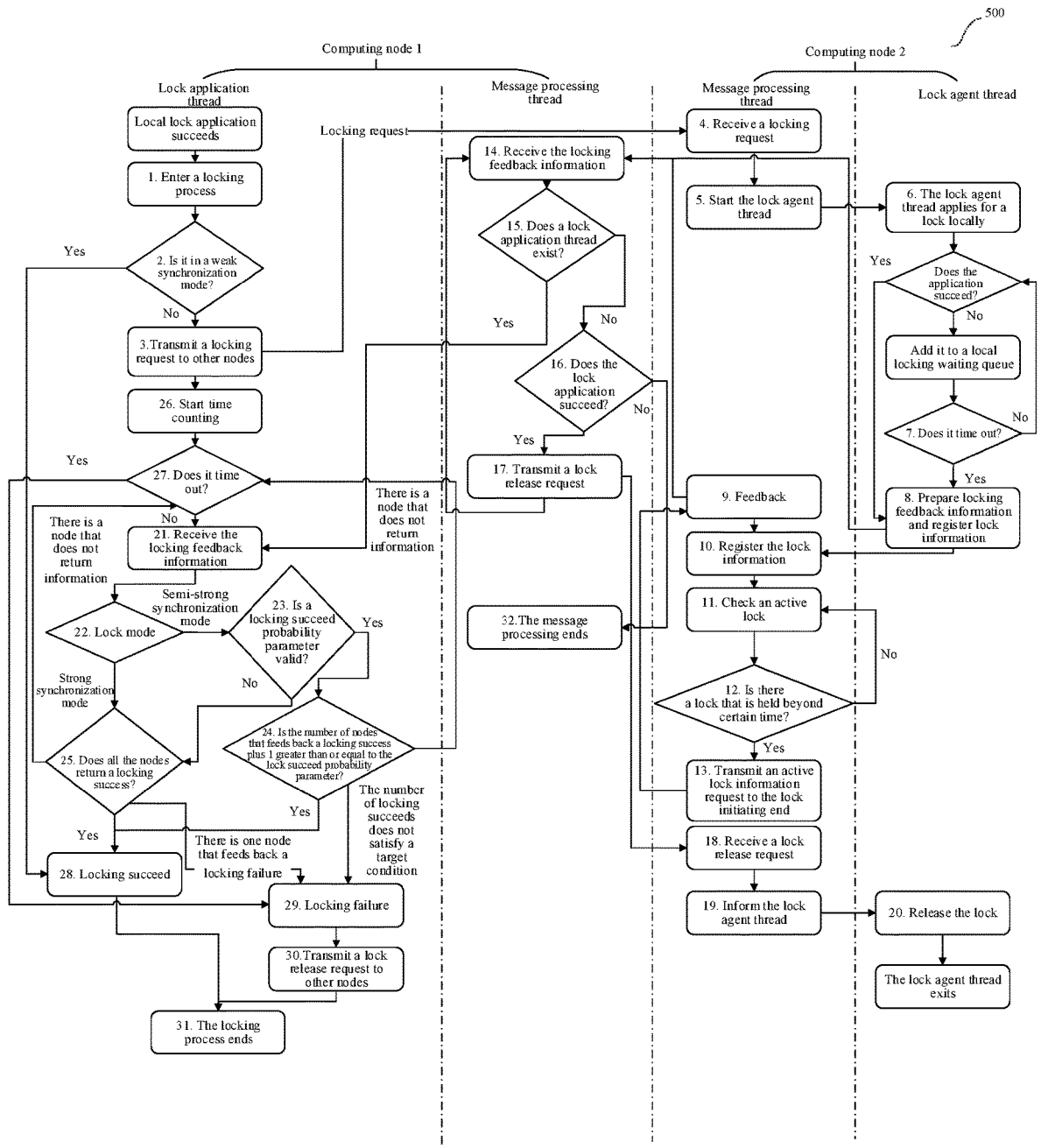
FIG. 5 is a schematic diagram of a principle of a locking process provided according to an embodiment of this application.

FIG. 5 is a schematic diagram of a principle of a locking process provided according to an embodiment of this application. As shown in 500, a clustered database includes a computing node 1 and a computing node 2. The computing node 1 is a first computing device, and a lock application thread and a message processing thread are run on the computing node 1, and the computing node 2 is a second computing device, and a message processing thread and a lock agent thread are run on the computing node 2. A DDL request serving as a data request is taken as an example. After the lock application thread of the computing node 1 successfully applies for a lock locally, a global locking process is performed. The global locking process is described in detail below:

Step 1. The lock application thread of the computing node 1 first completes the local lock application, and then performs a locking process.

Step 2. The lock application thread of the computing node 1 determines whether it is in a weak synchronization mode; directly considers, if it is in the weak synchronization mode, that a lock has been obtained (the correctness is guaranteed by a writing fence mechanism) without transmitting a locking application to other nodes, and performs step 28; and performs step 3 if it is not in the weak synchronization mode.

Step 3. If it is not in the weak synchronization mode, the lock application thread of the computing node 1 transmits a locking request to other nodes, performs step 4, and performs step 26 to start time counting.

Step 4. The message processing thread of the computing node 2 receives the locking request.

The message processing thread specially monitors locking requests, lock release requests, and locking feedback information of other nodes in the background, and is used for receiving and transmitting various types of lock-related messages. In a stage of applying for a lock, the message processing thread, as a message receiving end, invokes the lock agent thread to maintain the life cycle of a remote lock on the computing node 2. In a stage of returning locking feedback information, the following phenomenon may occur: When the locking feedback information arrives at an application end (the computing node 1), the lock application thread of the application end has crashed or exited, and the message processing thread on the computing node 1 will determine, according to whether the lock application thread has exited and whether the locking feedback information indicates a locking success, whether to transmit a lock release request to the computing node 2, to release the remote lock of the remote end which has been successfully applied.

Step 5. The computing node 2 starts a local lock agent thread and invokes a local application lock logic.

Step 6. The computing node 2 determines whether a lock corresponding to the DDL request is successfully applied, performs, if the application succeeds, step 8, and performs the following steps if the application fails: 6.1) The locking request is still in a locking waiting queue and waits in the queue, and continues to wait at this moment, and step 7 is performed to determine whether timeout occurs. 6.2) A deadlock is found in deadlock detection, and the computing node is selected as a deadlock victim and performs step 8.

Step 7. Computing node 2 determines whether the remote lock application has timed out, continues to wait if the remote lock application has not timed out, and performs step 8 if the remote lock application has timed out.

For example, in case of determining timeout, whether a waiting duration exceeds a third waiting threshold is determined.

Step 8. The computing node 2 transmits locking feedback information to the message processing thread of the computing node 1, and performs step 10.

In some embodiments, the locking feedback information may be divided into three categories: locking success, lock waiting timeout, and deadlock victim.

In some embodiments, the locking feedback information may be divided into two categories: a locking success and a locking failure. The locking failure includes lock waiting timeout and deadlock victim.

Step 9. A message feedback interface of the message processing thread of the computing node 2 processes an active lock information detection request initiated by the active lock information detection mechanism of steps 10-13, and transmits the active lock information detection request to the message processing thread of the computing node 1.

The active lock information detection request is directed to such a case that the lock application thread of the lock application end (the computing node 1) has exited, but the remote lock of the computing node 2 has not been released all the time. When the remote lock has not been released beyond a certain time period (for example, the active lock information detection threshold), the active lock information detection request is transmitted to the lock application end, namely, the lock owner, for active lock information detection.

Step 10. The lock agent thread of the computing node 2 registers lock information and lock states for all remote locks in the message processing thread.

The lock information includes but is not limited to a lock type (read lock, write lock, update lock, and the like), a data resource (such as a database name, a data table name, a data index ID, and a data column name) for a lock, locking time, and the like.

The lock states include but are not limited to an active state, an inactive state, and the like.

Step 11. The message processing thread of computing node 2 periodically checks active locks among the various remote locks in a registry.

For example, each piece of lock information in the registry is traversed to query for remote locks in active states.

Step 12. The computing node 2 determines whether there is a remote active lock exceeding the active lock information detection threshold; if so, performs step 13; and if not, continues to periodically monitor the lock information in the registry.

Step 13. Computing node 2 prepares to feed back the active lock information detection request, and performs step 9.

Step 14. The message processing thread of the computing node 1 receives the locking feedback information and the active lock information detection request.

Step 15. The computing node 1 determines whether the local lock application thread is active, performs step 16 if no, and performs step 21 if yes.

In the active state, there may be three cases: 15.1) If the current lock application thread is active in a lock application stage, corresponding lock application structure data is updated and transmitted to the lock application thread for processing. 15.2) If the current lock application thread has reached a target condition of a lock application success in the semi-strong synchronization mode, corresponding lock application structure data is updated, and the operation is completed. 15.3) If the current lock application thread is in a lock exited state or exits in a lock application failure (for example, it has been determined that the target condition is not satisfied in the semi-strong synchronization mode), corresponding lock application structure data is updated, and the operation is completed.

In some embodiments, the lock application structure data is used for recording locking feedback information of the various computing nodes 2, for example, in the form of a hash table, an array, a set, a vector, and the like. For example, a set form is used. Each element in the set represents whether a computing node succeeds or fails in locking. Element 0 represents a locking failure. Element 1 represents a locking success. Element null represents that no locking feedback information is received.

Step 16. If the locking feedback information at this moment indicates a locking success, or the active lock information detection request is received, the computing node 1 performs step 17. Otherwise, no processing is performed, and step 32 is performed, namely, the message processing is completed, and this received message is discarded.

Step 17. The message processing thread of the computing node 1 transmits a lock release request to the message processing thread of the computing node 2.

Step 18. The message processing thread of the computing node 2 receives the lock release request.

Step 19. The message processing thread of the computing node 2 notifies the lock agent thread to release the lock.

Step 20. The lock agent thread of the computing node 2 releases the lock.

Step 21. The lock application thread of the computing node 1 receives the locking feedback information transmitted by the message processing thread, which includes several types of locking feedback information involved step 8.

Step 22. Computing node 1 determines the current lock synchronization mode, performs step 25 if it is a strong synchronization mode, and performs step 23 if it is a semi-strong synchronization mode.

Step 23. The computing node 1 checks whether a locking success probability parameter lock_succ_node_num is set as a valid value (namely, greater than or equal to 1 and less than or equal to the number of all the computing devices in the cluster), performs step 24 according to the semi-strong synchronization mode if the locking success probability parameter lock_succ_node_num is a valid value, and performs step 25 according to the strong synchronization mode if the locking success probability parameter lock_succ_node_num is not a valid value.

Step 24. The computing node 1 determines whether the number of remote nodes that feedback locking success plus the number of the local node exceeds the locking success probability parameter lock_succ_node_num; performs step 28 if yes; determines, if no, whether the lock application times out, that is, whether the waiting duration exceeds the second waiting threshold; continues to wait if no waiting timeout occurs; displays a locking failure if waiting timeout occurs; and if the number of the remote nodes that feedback locking failure has exceeded a value obtained by subtracting the locking success probability parameter lock_succ_node_num from the total number of the nodes in the cluster, determines a locking failure, and performs step 29.

Step 25. The computing node 1 needs to determine, in the strong synchronization mode, whether all the nodes feedback a locking succeed; performs step 28 if the above condition is satisfied; continues to wait if the condition is not satisfied but no waiting timeout occurs, namely, if the waiting duration does not exceed a first waiting threshold; and determines a locking failure if any node feeds back a locking failure, and performs step 29.

Step 26. The computing node 1 starts to calculate lock application time.

Step 27. The computing node 1 determines whether the lock application time has timed out; performs step 29, namely, determines a locking failure, if yes; and performs step 21 to check the logic if no.

In some embodiments, a timeout threshold in the strong synchronization mode is the first waiting threshold, and a timeout threshold in the semi-strong synchronization mode is the second waiting threshold. Values of the two timeout thresholds may be the same or different.

Step 28. The computing node 1 determines a global locking success.

Step 29. The computing node 1 determines a global locking failure.

Step 30. The computing node 1 transmits a lock release request to all other nodes.

In some embodiments, since the active lock information detection logic of steps 11-20 exists on other nodes, after transmitting the lock release request, the computing node 1 can end the process without waiting for other nodes to return lock release feedback information.

Step 31. The computing node 1 completes the locking process.

Step 32. After the message processing is completed, the messages are discarded.

In this embodiment, the locking process is described in detail, and a flexible lock mechanism can be implemented in the distributed database to ensure the correctness of operations for modifying a certain data resource by various processes or threads. At the same time, the weak synchronization mode, the semi-strong synchronization mode, and the strong synchronization mode can be flexibly switched by means of the implementation of the flexible lock mechanism, so that a distributed database cluster can select lock mechanisms at different levels according to requirements of its own database application scenarios, to meet service requirements of users in different service scenarios.

Figure 6:
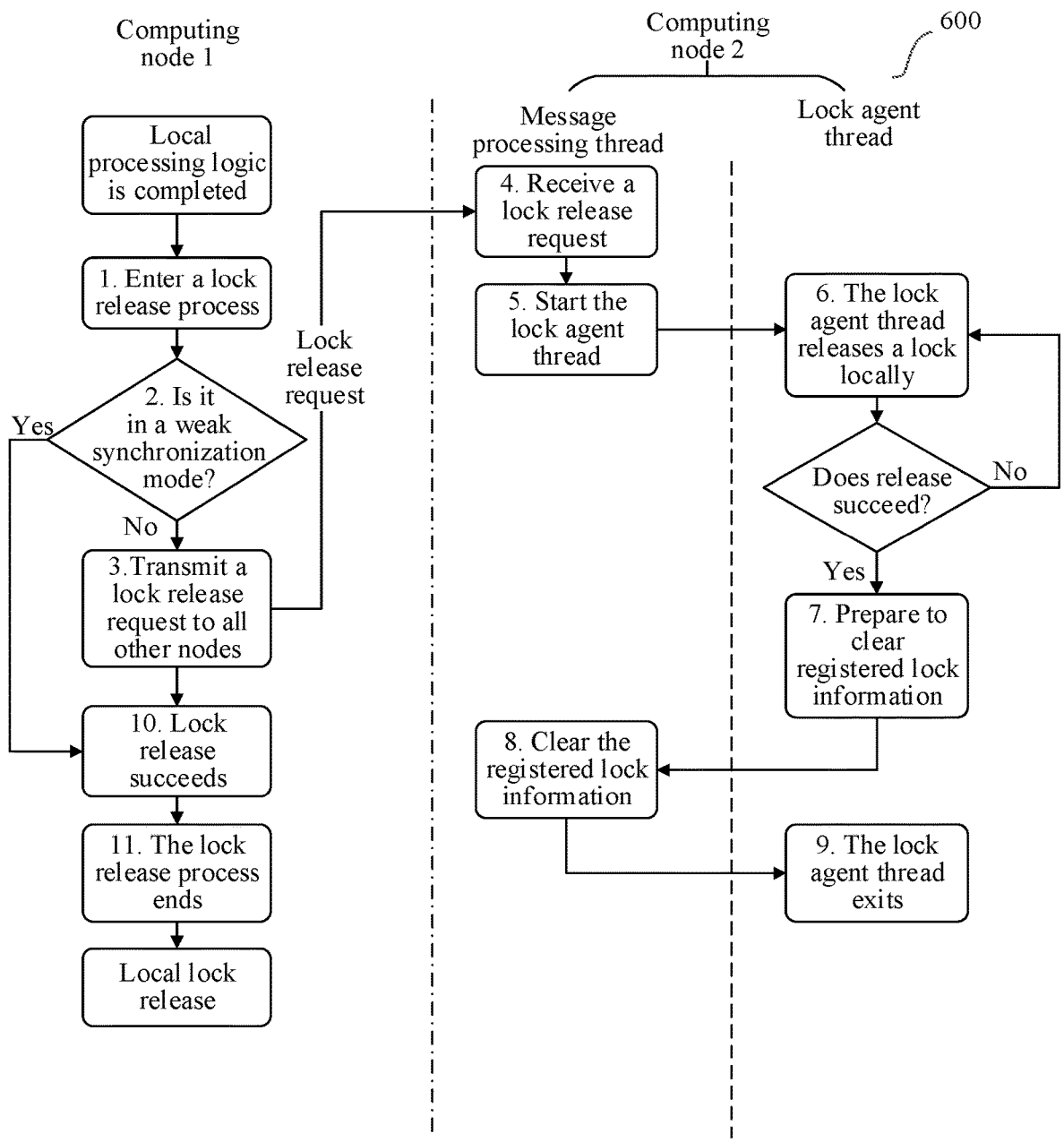
FIG. 6 is a schematic diagram of a principle of a lock release process provided according to an embodiment of this application.

FIG. 6 is a schematic diagram of a principle of a lock release process provided according to an embodiment of this application. As shown in 600, a clustered database includes a computing node 1 and a computing node 2. The computing node 1 is the first computing device, and the computing node 2 is a second computing device, and a message processing thread and a lock agent thread are run on the computing node 2. After succeeding in global locking, the computing node 1 executes a corresponding data request, such as a DDL request. After a local DDL transaction processing logic is completed, the computing node 1 may enter a lock release process. The lock release process is described in detail below:

Step 1. After the local DDL transaction processing logic is completed, the computing node 1 enters a lock release process.

When the computing node 1 that owns a lock completes a DDL transaction computing logic, the lock needs to be globally released. In this embodiment, an order of releasing a remote lock first and then releasing a local lock is taken as an example to describe the process of global lock release. In this case, the overall process of locking and lock release is as follows: local locking→remote locking→remote lock release→local lock release.

Step 2. Computing node 1 determines whether it is in a weak synchronization mode, and performs step 10 if it is in a weak synchronization mode, without releasing a remote lock, and performs step 3 if it is not in a weak synchronization mode.

Step 3. The computing node 1 transmits a lock release request to all other nodes.

Step 4. The message processing thread of the computing node 2 receives the lock release request.

Step 5. The message processing thread initiates the lock agent thread to locally release the corresponding remote lock.

For example, if the lock agent thread is in a hung state, the message processing thread wakes up the lock agent thread and performs a lock release operation.

Step 6. The lock agent thread locally releases the corresponding remote lock, performs step 7 if the release succeeds, and re-releases the corresponding remote lock if the release fails.

Step 7. The computing node 1 prepares to clear corresponding lock information in a registry.

Step 8. The computing node 1 clears lock information that has been registered in the registry.

Step 9. The lock agent thread exits.

Step 10. Lock release succeeds.

Step 11. The lock release process ends.

In this embodiment, how to perform the lock release process after the execution of the DDL request is completed is described in detail. If the active lock information detection mechanism detects that the DDL thread has crashed or the target condition in the lock synchronization mode is not satisfied, the triggered lock release process is similar to this embodiment and will not be described in detail here.

Figure 7:
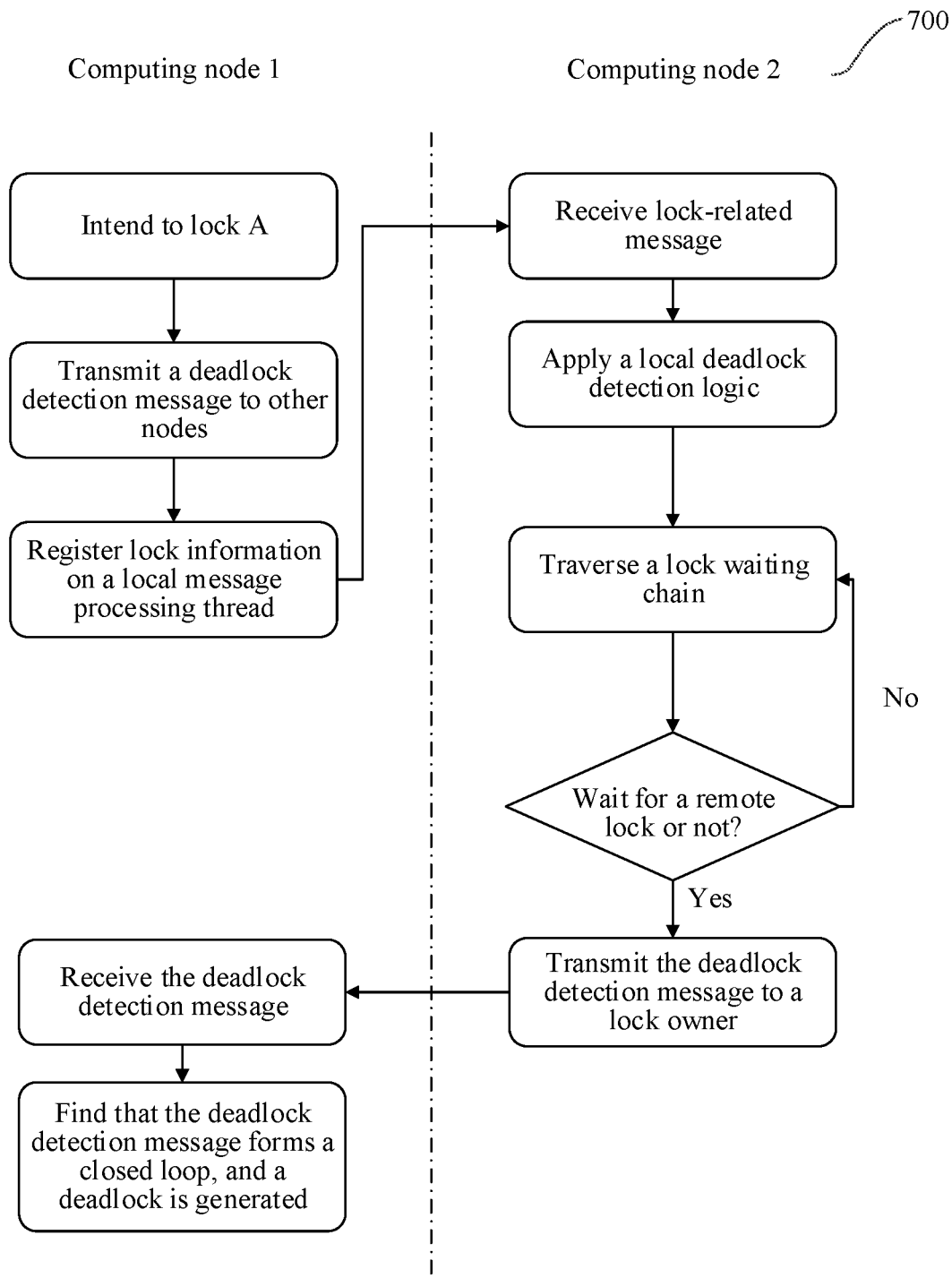
FIG. 7 is a schematic diagram of a principle of a deadlock detection process provided according to an embodiment of this application.

FIG. 7 is a schematic diagram of a principle of a deadlock detection process provided according to an embodiment of this application. As shown in 700, a clustered database includes a computing node 1 and a computing node 2. The computing node 1 is the first computing device, and the computing node 2 is a second computing device, and a message processing thread is run on the computing node 2. The deadlock detection process is described below:

Step 1. Computing node 1 intends to lock data resource A.

Step 2. Computing node 1 transmits a deadlock detection message to other nodes, and performs step 3 and step 10.

Step 3. The message processing thread of computing node 2 receives the deadlock detection message.

For example, the deadlock detection message includes relevant lock information.

Step 4. The computing node 2 applies a local deadlock detection logic to perform local deadlock detection; performs step 5 if the deadlock detection succeeds; and returns, if the deadlock detection fails, a message indicating that the computing node itself is selected as a deadlock victim.

Step 5. The computing node 2 traverses a lock waiting chain.

Step 6. The computing node determines whether a current lock in the lock waiting chain is a remote lock; performs step 7 if the current lock is a remote lock; and traverses a next lock on the lock waiting chain if the current lock is not a remote lock.

Step 7. The computing node 2 transmits the deadlock detection message to a lock owner.

In this embodiment, the lock owner is described by taking the computing node 1 as an example.

Step 8. The computing node 1 receives the deadlock detection message.

Step 9. If it is found that the deadlock detection message forms a closed loop, a deadlock is generated.

Step 10. The computing node 1 registers lock information on the local message processing thread.

In this embodiment, the local deadlock detection logic needs to be performed, and adaptation is also performed on the distributed database. During traversing of the lock waiting chain, whether a lock is a remote lock is determined; if the lock is not a remote lock, whether a deadlock is generated can be found in the local deadlock detection logic; if the lock is a remote lock, a deadlock detection message is transmitted to a lock owner (namely, a computing node where a lock holding thread is located); and if the node that owns the lock and the computing node that initiates the deadlock detection are the same node, it indicates that a closed loop is formed, namely, a deadlock is generated. For example, in this embodiment, the computing node 1 waits for the computing node 2, and the computing node 2 waits for the computing node 1, forming a closed loop. In a case of a deadlock, the current lock application operation will be rejected, and at this moment, the database engine may automatically retry after an interval of a time period, or returns a rejection message to the user, and the user retries after waiting for a time period.

In each of the above-mentioned embodiments, the locking process, the lock release process, and the deadlock detection process in the distributed database are described in detail. However, in this embodiment, the performance of this lock synchronization mechanism in an abnormal scenario will be analyzed in detail, to explain how the above-mentioned lock synchronization mechanism responds to abnormal scenarios, such as computing node network partitioning, network instability, network delay or network packet loss in a distributed scenario.

If an administrator selects a weak synchronization mode, since the weak synchronization mode does not need to apply for a lock from a remote end, and the correctness of a resource operation is guaranteed by a writing fence mechanism, it is equivalent to that a DDL transaction which needs to apply for a lock has a higher priority. However, as the DDL transaction advances, it is possible to roll back a DML transaction of a user. Usually, the DML transaction is a key service of the user. Therefore, in some scenarios, the user experience is poor, but the weak synchronization mode is applicable to application scenarios with many DDL transactions.

If an administrator selects a strong synchronization mode, it can be ensured that a DDL transaction and a DML transaction are treated equally. However, in a case of poor network conditions, since the DDL transaction needs to apply for a global lock, it is necessary to wait for all other nodes in the cluster to return locking feedback information. As a result, one or several nodes will not return the locking feedback information in time because of the partitioning or network delay, causing that during this waiting period, other nodes in the whole distributed cluster reject to execute the DML transaction because locks have applied successfully, which finally results in slow response of the whole cluster and makes a user feel that the whole cluster cannot provide services. Therefore, the user experience is poor in the strong synchronization mode in case of poor network conditions.

However, if an administrator selects a semi-strong synchronization mode, a compromise can be provided. That is, a flexible and configurable cluster running mode can be provided between the influence caused by the above-mentioned network problem of a distributed system and a high demand of users for service execution success. A locking success probability parameter lock_succ_node_num needs to be set for the semi-strong synchronization mode, to determine how many nodes that returns feedback information can achieve a global lock application success: If lock_succ_node_num=0, it is equivalent to the weak synchronization mode. If lock_succ_node_num=n, n is the total number of the nodes, namely, the computing devices, in the cluster, and it is equivalent to the strong synchronization mode. If 0<lock_succ_node_num<n, it is equivalent to the semi-strong synchronization mode.

By providing the locking success probability parameter lock_succ_node_num, the administrator can set a reasonable value according to a network condition of its own cluster, to ensure to the maximum extent that DML transactions of users can be treated fairly with DDL transactions. At the same time, no response of one or more nodes will cause the whole cluster unavailable, for example, cause the whole cluster hung.

In addition, steps 10-20 in the above-mentioned locking process also provide an active lock information detection mechanism, to ensure that a remote node can actively perform, when a lock release request cannot be transmitted to other nodes for some reasons, active lock information detection by means of an active lock information detection mechanism, to release a remote lock.

In this embodiment, by providing the flexible locking mechanism, the administrator is provided with a flexible adjustment method for determining a lock synchronization mode according to a network environment in which a distributed database cluster is run and requirements for a DML transaction success rate, so that a user can use the computing capability of the distributed cluster to the maximum extent, and at the same time, the various nodes of the distributed cluster can perform like a database system of a single node in a running process.

Figure 8:
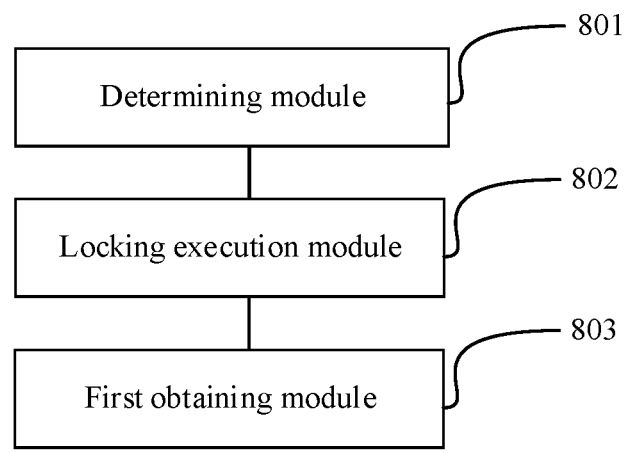
FIG. 8 is a schematic structural diagram of a request processing apparatus provided according to an embodiment of this application.

FIG. 8 is a schematic structural diagram of a request processing apparatus provided according to an embodiment of this application. Referring to FIG. 8, the apparatus includes:
- a determining module 801, configured to determine a lock synchronization mode of the clustered database in response to a data request;
- a locking execution module 802, configured to: lock a data resource corresponding to the data request when the lock synchronization mode is a weak synchronization mode, and execute the data request; and
- a first obtaining module 803, configured to obtain locking feedback information about the data resource by at least one second computing device in the clustered database when the lock synchronization mode is not the weak synchronization mode, the locking feedback information being used for representing whether the second computing device successfully locks the data resource; and
- the locking execution module 802 being further configured to lock the data resource corresponding to the data request when the obtained locking feedback information satisfies a target condition corresponding to the lock synchronization mode, and execute the data request.

According to the apparatus provided in this embodiment, by setting a plurality of flexible levels for lock synchronization modes, in a weak synchronization mode, a data resource corresponding to a data request is directly locked, and the data request is executed, which can ensure that the data request is advanced preferentially, without waiting for a response of a second computing device. In a non-weak synchronization mode, locking feedback information of various second computing devices is obtained. When the obtained locking feedback information satisfies a target condition, the data resource is locked, and the data request is executed. Different lock synchronization modes can be selected in different service scenarios, thereby ensuring that a clustered database can meet processing requirements of different service scenarios, which improves the processing capability of a clustered database system.

In one embodiment, based on the device composition of FIG. 8, the first obtaining module 803 includes:
- a transmission unit, configured to transmit a locking request associated with the data request to the at least one second computing device; and
- a receiving unit, configured to receive the locking feedback information returned by the at least one second computing device on the basis of the locking request.

In one embodiment, the transmitting unit is configured to: transmit the locking request to a message processing thread on the at least one second computing device respectively via a message processing thread on the first computing device.

The receiving unit is configured to: receive, via the message processing thread on the first computing device, the locking feedback information returned by the message processing thread on the at least one second computing device.

In one embodiment, based on the device composition of FIG. 8, the apparatus further includes:
- a transmission module, configured to transmit, in response to receiving the locking feedback information of any second computing device, the locking feedback information to a lock application thread of the data request via the message processing thread when the data request is in an active state.

The transmission module is also configured to transmit a lock release request to the second computing device when the data request is not in an active state and that the locking feedback information represents a locking success, the lock release request being used for instructing the second computing device to release the data resource corresponding to the data request.

In one embodiment, when the lock synchronization mode is the strong synchronization mode, the target condition is that the locking feedback information of the at least one second computing device represents a locking success. When the lock synchronization mode is the semi-strong synchronization mode, the target condition is that the locking feedback information of a target number or a larger number of second computing devices among the at least one second computing device represents a locking success.

In one embodiment, when the lock synchronization mode is the strong synchronization mode, the target condition is that the waiting duration does not exceed the first waiting threshold, and the locking feedback information of the at least one second computing device represents a locking success. When the lock synchronization mode is the semi-strong synchronization mode, the target condition is that the waiting duration does not exceed the second waiting threshold and the locking feedback information of a target number or larger number of second computing devices among the at least one second computing device represents a locking success.

In one embodiment, based on the device composition of FIG. 8, the apparatus further includes:
- a second obtaining module, configured to obtain the target number when the lock synchronization mode is the semi-strong synchronization mode; and
- a switching module, configured to switch the lock synchronization mode to the strong synchronization mode when the target number is less than one or greater than the number of all the second computing devices in the clustered database.

In one embodiment, based on the device composition of FIG. 8, the apparatus further includes:
- a transmission module, configured to transmit a lock release request to the at least one second computing device when the obtained locking feedback information does not satisfy the target condition or the execution of the data request is completed, the lock release request being used for instructing the second computing device to release the data resource corresponding to the data request.

In one embodiment, the data request is a DDL request.

All the above technical solutions can be used in any combination to form the embodiments of this application, which will not be described in detail here.

The request processing apparatus provided by the above embodiment is only illustrated by dividing the functional modules above when processing the data request. In practical applications, the foregoing functions may be allocated to and completed by different functional modules as required, that is, an inner structure of a computing device is divided into different functional modules, so as to complete all or some of the functions described above. In addition, the request processing apparatus and the request processing method provided in the above embodiments belong to the same idea. Details of specific implementation processes of the apparatus refer to the request processing method embodiment, and are not described here again.

Figure 9:
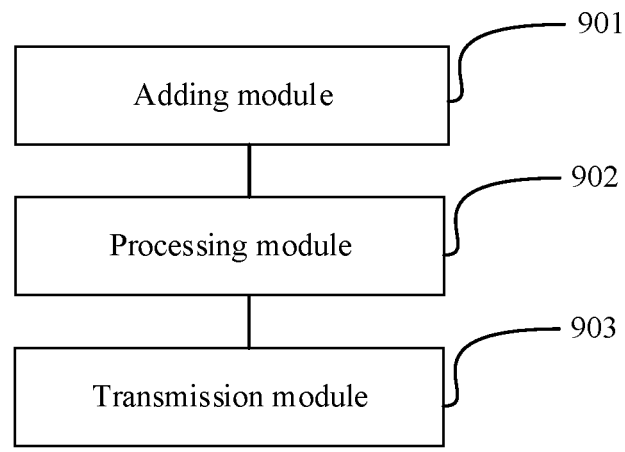
FIG. 9 is a schematic structural diagram of a request processing apparatus provided according to an embodiment of this application.

FIG. 9 is a schematic structural diagram of a request processing apparatus provided according to an embodiment of this application. Referring to FIG. 9, the apparatus includes:
- an adding module 901, configured to add the locking request to a locking waiting queue in response to a locking request associated with a data request; the locking request being transmitted by a first computing device in the clustered database when a lock synchronization mode is not a weak synchronization mode;
- a processing module 902, configured to process the locking request in the locking waiting queue to obtain locking feedback information; and
- a transmission module 903, configured to transmit the locking feedback information to the first computing device.

According to the apparatus provided in this embodiment, by setting a plurality of flexible levels for lock synchronization modes, the first computing device will transmit a locking request if it is not in a weak synchronization mode, so that corresponding locking feedback information is returned in response to the locking request. When the obtained locking feedback information satisfies the target condition, the first computing device is triggered to lock the data resource and execute the data request. Therefore, the clustered database supports to select different lock synchronization modes in different service scenarios, thereby ensuring that a clustered database can meet processing requirements of different service scenarios, which improves the processing capability of a clustered database system.

In one embodiment, the processing module 902 is configured to:
- lock a data resource corresponding to the data request, and determine that the locking feedback information represents a locking success; and
- when a waiting duration of the locking request in the locking waiting queue exceeds a third waiting threshold or that deadlock detection fails, determine that the locking feedback information represents a locking failure.

In one embodiment, based on the device composition of FIG. 9, the apparatus further includes:
- a detection module, configured to perform local deadlock detection on the locking request in response to a deadlock detection message of the first computing device;
- a first determining module, configured to determine, when the lock deadlock detection fails, that the deadlock detection fails; and

- a second determining module, configured to determine a lock waiting chain of the locking request when the lock deadlock detection succeeds, the lock waiting chain including lock information that has a dependency relationship with the locking request;
- the transmission module 903 being further configured to transmit, when the lock waiting chain includes a remote lock, the deadlock detection message to a third computing device that initiates the remote lock, the remote lock being lock information that has been registered in the second computing device but is not initiated by the second computing device; and
- the first determining module being further configured to: when any computing device that transmits the deadlock detection message receives the deadlock detection message, determine that the deadlock detection fails.

In one embodiment, the adding module 901 is configured to:
- receive the locking request via a message processing thread on the second computing device;
- start a lock agent thread corresponding to the locking request via the message processing thread; and
- add the locking request to the locking waiting queue via the lock agent thread.

In one embodiment, based on the device composition of FIG. 9, the apparatus further includes:
- a registration module, configured to register lock information corresponding to the data request when the data resource corresponding to the data request is locked; and
- a third determining module, configured to determine whether the lock information is active lock information at an interval of a target duration; and
- the transmission module 903 being further configured to transmit an active lock information detection request to the first computing device when the lock information is active lock information and a locking duration of the data resource corresponding to the data request exceeds an active lock information detection threshold, the active lock information detection request being used for requesting the first computing device to indicate whether to release the data resource.

In one embodiment, based on the device composition of FIG. 9, the apparatus further includes:
- a release module, configured to release, in response to the lock release request associated with the data request, the data resource corresponding to the data request.

All the above technical solutions can be used in any combination to form the embodiments of this application, which will not be described in detail here.

The request processing apparatus provided by the above embodiment is only illustrated by dividing the functional modules above when processing the data request. In practical applications, the foregoing functions may be allocated to and completed by different functional modules as required, that is, an inner structure of a computing device is divided into different functional modules, so as to complete all or some of the functions described above. In addition, the request processing apparatus and the request processing method provided in the above embodiments belong to the same idea. Details of specific implementation processes of the apparatus refer to the request processing method embodiment, and are not described here again.

Figure 10:
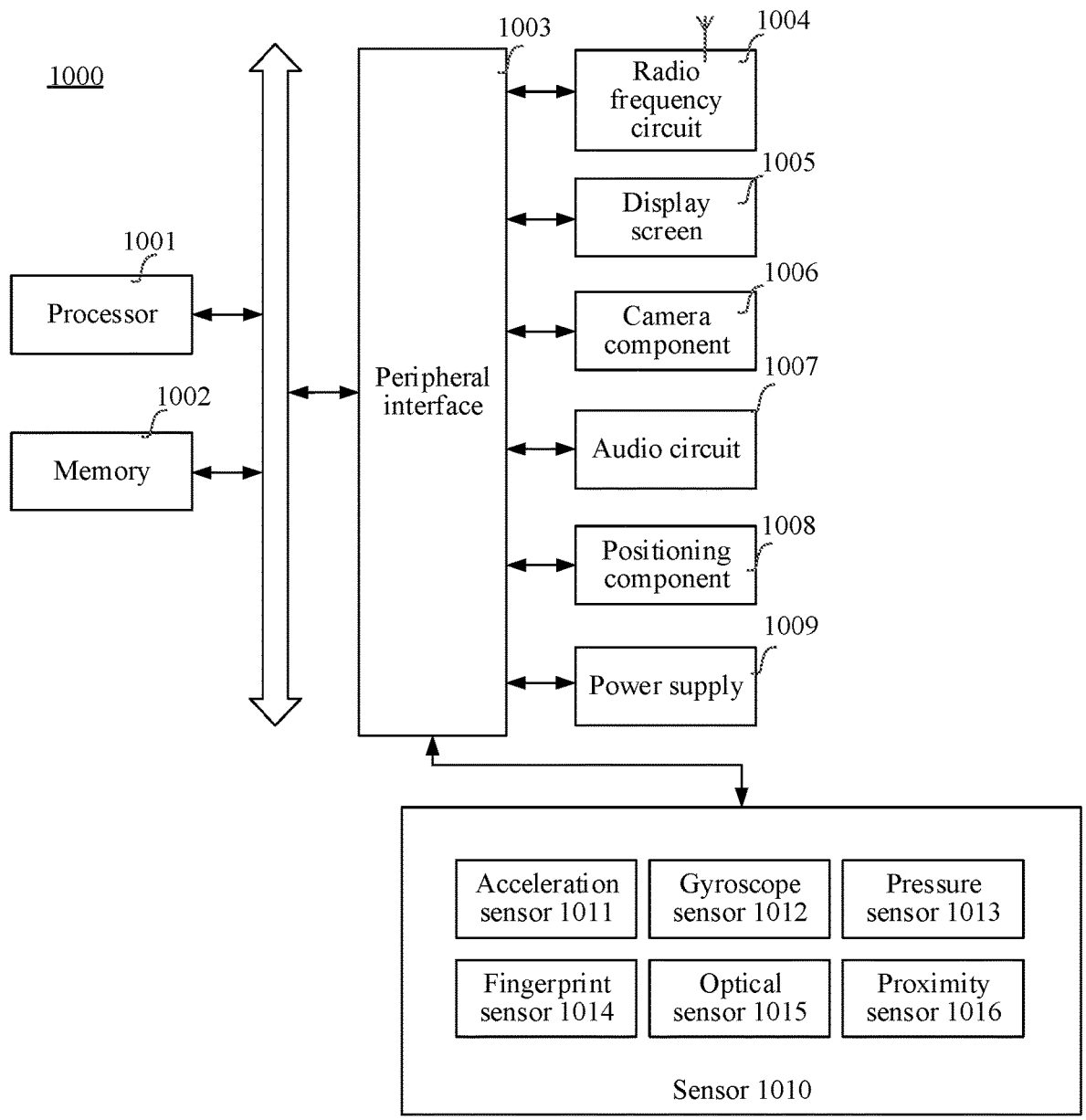
FIG. 10 is a schematic structural diagram of a computing device according to an embodiment of this application.

FIG. 10 is a schematic structural diagram of a computing device according to an embodiment of this application. The computing device is described by taking terminal 1000 as an example. In some embodiments, a device type of the terminal 1000 includes: a smart phone, a tablet computer, an MP3 (Moving Picture Experts Group Audio Layer III) player, an MP4 (Moving Picture Experts Group Audio Layer IV) player, a notebook computer or a desktop computer. The terminal 1000 may also be referred to as another name such as user equipment, a portable terminal, a laptop terminal, or a desktop terminal.

Generally, terminal 1000 includes: a processor 1001 and a memory 1002.

In some embodiments, processor 1001 includes one or more processing cores, for example, a 4-core processor or an 8-core processor. In some embodiments, processor 1001 is implemented in at least one hardware form of Digital Signal Processing (DSP), a Field-Programmable Gate Array (FPGA), a Programmable Logic Array (PLA). In some embodiments, processor 1001 includes a main processor and a coprocessor. The main processor is a processor configured to process data in an awake state, and is also referred to as a central processing unit (CPU). The coprocessor is a low power consumption processor configured to process the data in a standby state. In some embodiments, processor 1001 is integrated with a graphics processing unit (GPU). The GPU is configured to render and draw content that needs to be displayed on a display screen. In some embodiments, processor 1001 further includes an artificial intelligence (AI) processor. The AI processor is configured to process computing operations related to machine learning.

In some embodiments, memory 1002 includes one or more computer-readable storage media. In some embodiments, the computer-readable storage media are non-transitory. In some embodiments, the memory 1002 also includes a high speed random access memory, and a non-volatile memory, such as one or more magnetic disk storage devices and flash storage devices. In some embodiments, the non-transitory computer-readable storage medium in the memory 1002 is configured to store at least one program code which is used for being executed by the processor 1001 to implement the request processing methods provided in the various method embodiments of this application.

In some embodiments, the terminal 1000 may also include: a peripheral interface 1003 and at least one peripheral. The processor 1001, the memory 1002, and the peripheral interface 1003 can be connected through a bus or a signal cable. Each peripheral can be connected to the peripheral interface 1003 through a bus, a signal cable, or a circuit board. Specifically, the peripheral includes at least one of a radio frequency circuit 1004, a display screen 1005, a camera component 1006, an audio circuit 1007, a positioning component 1008, and a power supply 1009.

In some embodiments, the terminal 1000 further includes one or more sensors 1010. The one or more sensors 1010 include but are not limited to: an acceleration sensor 1011, a gyroscope sensor 1012, a pressure sensor 1013, a fingerprint sensor 1014, an optical sensor 1015, and a proximity sensor 1016.

Those skilled in the art can understand that the structure shown in FIG. 10 is not a limitation of the terminal 1000 and can include more or fewer components than shown, or combine certain components, or employ a different arrangement of components.

Figure 11:
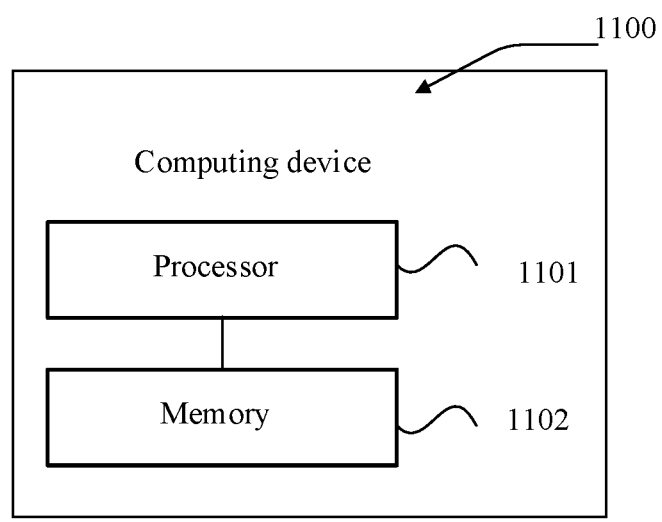
FIG. 11 is a schematic structural diagram of a computing device according to an embodiment of this application.

FIG. 11 is a schematic structural diagram of a computing device provided according to an embodiment of this application. The computing device 1100 may vary a lot due to different configurations or performances. The computing device 1100 includes one or more CPUs 1101 and one or more memories 1102. Memory 1102 stores at least one computer program, and at least one computer program is loaded and executed by the one or more CPUs 1101 to implement the request processing methods provided in all the above embodiments. In some embodiments, the computing device 1100 also includes components such as a wired or wireless network interface, a keyboard, and an input/output interface, to facilitate inputting and outputting. The computing device 1100 further includes other components for realizing the functions of the device, which will not be described in detail herein.

In one embodiment, a computer-readable storage medium is further provided, for example, a memory including at least one computer program. At least one computer program can be executed by a processor in a terminal to implement the request processing methods in the above embodiments. For example, the computer-readable storage medium includes a Read-Only Memory (ROM), a Random-Access Memory (RAM), a Compact Disc Read-Only Memory (CD-ROM), a magnetic tape, a floppy disk, an optical data storage device, and the like.

In one embodiment, a computer program product or computer program is further provided, including one or more program codes stored in a computer-readable storage medium. One or more processors of a computing device can read the one or more program codes from a computer-readable storage medium, the one or more processors executing the one or more program codes to enable the computing device to implement the request processing methods in the above embodiments.

Those of ordinary skill in the art will appreciate that all or part of the steps for implementing the embodiments described above can be performed by hardware or by instructing relevant hardware by a program. In some embodiments, the program is stored in a computer-readable storage medium. In some embodiments, the storage medium mentioned above is an ROM, a magnetic disk, an optical disk, or the like.

The foregoing descriptions are merely embodiments of this application, but are not intended to limit this application. Any modification, equivalent replacement, or improvement made within the spirit and principle of this application shall fall within the protection scope of this application.

What is claimed is:

1. A request processing method, performed by a first computing device in a clustered database and comprising:
   determining a lock synchronization mode of the clustered database in response to a data request, the clustered database being implemented at a cluster comprising the first computing device and at least one second computing device, the lock synchronization mode being from a set comprising a weak synchronization mode and at least one non-weak synchronization mode, each synchronization mode in the set corresponding to a respective target condition for determining whether a data resource is locked for the clustered database, each target condition being associated with a respective threshold number of second computing devices that have locked the data resource;
   locking a first data resource corresponding to the data request when the lock synchronization mode is the weak synchronization mode, and executing the data request; and
   when the lock synchronization mode is not the weak synchronization mode:
      transmitting a locking request associated with the data request to the at least one second computing device in the clustered database;

obtaining locking feedback information about the first data resource by the at least one second computing device in the clustered database, the locking feedback information indicating whether the at least one second computing device has locked the first data resource; and locking the first data resource corresponding to the data request when the obtained locking feedback information satisfies the target condition corresponding to the lock synchronization mode, and executing the data request.

2. The method according to claim 1, wherein the obtaining the locking feedback information about the first data resource by the at least one second computing device in the clustered database comprises:

receiving the locking feedback information returned by the at least one second computing device on the basis of the locking request.

3. The method according to claim 2, wherein the transmitting the locking request associated with the data request to the at least one second computing device comprises:

transmitting the locking request to a message processing thread on the at least one second computing device respectively via a message processing thread on the first computing device; and the receiving the locking feedback information returned by the at least one second computing device on the basis of the locking request comprises:

receiving the locking feedback information returned by the message processing thread on the at least one second computing device via the message processing thread on the first computing device.

4. The method according to claim 3, further comprising:

transmitting the locking feedback information to a lock application thread of the data request via the message processing thread when the data request is in an active state in response to receiving the locking feedback information of any second computing device; and transmitting a lock release request to the at least one second computing device when the data request is not in an active state and that the locking feedback information indicates a locking success, the lock release request instructing the at least one second computing device to release the first data resource corresponding to the data request.

5. The method according to claim 1, wherein the at least one non-weak synchronization mode comprises a strong synchronization mode and a semi-strong synchronization mode, the target condition associated with the strong synchronization mode is that the locking feedback information of the at least one second computing device indicates a locking success; and the target condition associated with the semi-strong synchronization mode is that the locking feedback information of a target number or a larger number of second computing devices among the at least one second computing device indicates a locking success.

6. The method according to claim 1, wherein the at least one non-weak synchronization mode comprises a strong synchronization mode and a semi-strong synchronization mode, the target condition associated with the strong synchronization mode is that a waiting duration does not exceed a first waiting threshold and the locking feedback information of the at least one second computing device indicates a locking success; and the target condition associated with the semi-strong synchronization mode is that a waiting duration does not exceed a second waiting threshold and the locking feedback information of a target number or larger number of second computing devices among the at least one second computing device indicates a locking success.

7. The method according to claim 5, further comprising:

obtaining the target number when the lock synchronization mode is the semi-strong synchronization mode; and switching the lock synchronization mode to the strong synchronization mode when the target number is less than one or greater than the number of all the at least one second computing devices in the clustered database.

8. The method according to claim 1, further comprising:

transmitting a lock release request to the at least one second computing device when the obtained locking feedback information does not satisfy the target condition or the execution of the data request is completed, the lock release request instructing the at least one second computing device to release the first data resource corresponding to the data request.

9. The method according to claim 1, wherein the data request is a data definition language (DDL) request.

10. A first computing device in a clustered database, comprising: one or more processors and one or more memories, the one or more memories storing at least one computer program, and the at least one computer program being loaded and executed by the one or more processors to implement:

determining a lock synchronization mode of the clustered database in response to a data request, the clustered database being implemented at a cluster comprising the first computing device and at least one second computing device, the lock synchronization mode being from a set comprising a weak synchronization mode and at least one non-weak synchronization mode, each synchronization mode in the set corresponding to a respective target condition for determining whether a data resource is locked for the clustered database, each target condition being associated with a respective threshold number of second computing devices that have locked the data resource;

locking a first data resource corresponding to the data request when the lock synchronization mode is the weak synchronization mode, and executing the data request; and when the lock synchronization mode is not the weak synchronization mode:

transmitting a locking request associated with the data request to the at least one second computing device in the clustered database;

obtaining locking feedback information about the first data resource by the at least one second computing device in the clustered database, the locking feedback information indicating whether the at least one second computing device has locked the first data resource; and locking the first data resource corresponding to the data request when the obtained locking feedback information satisfies the target condition corresponding to the lock synchronization mode, and executing the data request.

11. The first computing device according to claim 10, wherein the obtaining the locking feedback information about the first data resource by at least one second computing device in the clustered database comprises:

receiving the locking feedback information returned by the at least one second computing device on the basis of the locking request.

12. The first computing device first computing device according to claim 11, wherein the transmitting the locking request associated with the data request to the at least one second computing device comprises:
  transmitting the locking request to a message processing thread on the at least one second computing device respectively via a message processing thread on the first computing device; and
  the receiving the locking feedback information returned by the at least one second computing device on the basis of the locking request comprises:
  receiving the locking feedback information returned by the message processing thread on the at least one second computing device via the message processing thread on the first computing device.

13. The first computing device according to claim 12, further comprising:
  transmitting the locking feedback information to a lock application thread of the data request via the message processing thread when the data request is in an active state in response to receiving the locking feedback information of any second computing device; and
  transmitting a lock release request to the at least one second computing device when the data request is not in an active state and that the locking feedback information indicates a locking success, the lock release request instructing the at least one second computing device to release the first data resource corresponding to the data request.

14. The first computing device according to claim 10, wherein the at least one non-weak synchronization mode comprises a strong synchronization mode and a semi-strong synchronization mode, the target condition associated with the strong synchronization mode is that the locking feedback information of the at least one second computing device indicates a locking success; and the target condition associated with the semi-strong synchronization mode is that the locking feedback information of a target number or a larger number of second computing devices among the at least one second computing device indicates a locking success.

15. The first computing device according to claim 10, wherein the at least one non-weak synchronization mode comprises a strong synchronization mode and a semi-strong synchronization mode, the target condition associated with the strong synchronization mode is that a waiting duration does not exceed a first waiting threshold and the locking feedback information of the at least one second computing device indicates a locking success; and the target condition associated with the semi-strong synchronization mode is that a waiting duration does not exceed a second waiting threshold and the locking feedback information of a target number or larger number of second computing devices among the at least one second computing device indicates a locking success.

16. The first computing device according to claim 14, further comprising:
  obtaining the target number when the lock synchronization mode is the semi-strong synchronization mode; and
  switching the lock synchronization mode to the strong synchronization mode when the target number is less than one or greater than the number of all the at least one second computing devices in the clustered database.

17. The first computing device according to claim 10, further comprising:
  transmitting a lock release request to the at least one second computing device when the obtained locking feedback information does not satisfy the target condition, or the execution of the data request is completed, the lock release request instructing the at least one second computing device to release the first data resource corresponding to the data request.

18. The first computing device according to claim 10, wherein the data request is a data definition language (DDL) request.

19. A non-transitory computer-readable storage medium, comprising: at least one computer program, and the computer program being loaded and executed by one or more processors of by a first computing device in a clustered database to implement:
  determining a lock synchronization mode of the clustered database in response to a data request, the clustered database being implemented at a cluster comprising the first computing device and at least one second computing device, the lock synchronization mode being from a set comprising a weak synchronization mode and at least one non-weak synchronization mode, each synchronization mode in the set corresponding to a respective target condition for determining whether a data resource is locked for the clustered database, each target condition being associated with a respective threshold number of second computing devices that have locked the data resource;
  locking a first data resource corresponding to the data request when the lock synchronization mode is the weak synchronization mode, and executing the data request; and
  when the lock synchronization mode is not the weak synchronization mode:
    transmitting a locking request associated with the data request to the at least one second computing device in the clustered database;
    obtaining locking feedback information about the first data resource by the at least one second computing device in the clustered database, the locking feedback information indicating whether the at least one second computing device has locked the first data resource; and
    locking the first data resource corresponding to the data request when the obtained locking feedback information satisfies the target condition corresponding to the lock synchronization mode, and executing the data request.

20. The computer-readable storage medium according to claim 19, wherein the obtaining the locking feedback information about the first data resource by the at least one second computing device in the clustered database comprises:
  receiving the locking feedback information returned by the at least one second computing device on the basis of the locking request.

* * * * *